United States Patent
Prems et al.

(10) Patent No.: US 12,380,578 B2
(45) Date of Patent: Aug. 5, 2025

(54) APPARATUS AND A METHOD FOR ON-DEMAND REGISTRATION OF WHOLE SLIDE IMAGES

(71) Applicant: Pramana, Inc., Cambridge, MA (US)

(72) Inventors: Jithin Prems, Dooravani Nagar (IN); Manish Shiralkar, Pune (IN); Prasanth Perugupalli, Cary, NC (US); Jaya Jain, Shahpura (IN); Raghubansh Bahadur Gupta, Bangalore (IN); Tasin Ahmed, Scarborough (CA); Falgun Meshram, Toronto (CA); Seth Marquardt, Berkeley, CA (US); Bharathwaj Raghunathan, Oakville (CA)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 18/744,575

(22) Filed: Jun. 14, 2024

(65) Prior Publication Data
US 2024/0420352 A1   Dec. 19, 2024

Related U.S. Application Data

(60) Provisional application No. 63/508,785, filed on Jun. 16, 2023.

(51) Int. Cl.
*G06T 7/33*   (2017.01)
*G06T 7/37*   (2017.01)

(52) U.S. Cl.
CPC ........... *G06T 7/337* (2017.01); *G06T 7/37* (2017.01); *G06T 2207/10056* (2013.01);
(Continued)

(58) Field of Classification Search
None
See application file for complete search history.

(56) References Cited

U.S. PATENT DOCUMENTS

| | | | |
|---|---|---|---|
| 9,818,190 B2 | 11/2017 | Chukka et al. | |
| 10,872,472 B2 * | 12/2020 | Watola | G02B 27/0172 |

(Continued)

FOREIGN PATENT DOCUMENTS

CN   115170627 A   10/2022

OTHER PUBLICATIONS

M. Paknezhad et al; Regional registration of whole slide image stacks containing major histological artifacts; BMC Bioinformatics. 2020; 21: 558.

(Continued)

*Primary Examiner* — Nancy Bitar
(74) *Attorney, Agent, or Firm* — Caldwell Intellectual Property Law

(57) ABSTRACT

A method for on-demand registration of whole slide images (WSIs), comprising receiving at least two digital images, a first digital image of a reference slide and a second digital image on a candidate slide, each at a first magnification level, identifying a first region of interest (ROI) on the first digital image at a target magnification level, registering a portion of the second digital image to a portion of the first digital slide image at the first magnification level to derive a transformation matrix, applying the transformation matrix to the first ROI to identify a second ROI on the second digital image at the first magnification level, mapping the second ROI to a corresponding second ROI on the second digital image at the target magnification level, and registering the corresponding second ROI to the first ROI at the target magnification level.

18 Claims, 14 Drawing Sheets

(52) U.S. Cl.
CPC ............... *G06T 2207/20016* (2013.01); *G06T 2207/20081* (2013.01); *G06T 2207/30004* (2013.01)

(56) References Cited

U.S. PATENT DOCUMENTS

| | | |
|---|---|---|
| 10,943,346 B2 | 3/2021 | Wirch et al. |
| 11,983,845 B1 * | 5/2024 | Frank .................. G06F 3/04842 |
| 2021/0056287 A1 * | 2/2021 | Schaumburg ...... G06V 30/2504 |
| 2024/0029409 A1 * | 1/2024 | Aidt ....................... G06V 10/22 |

OTHER PUBLICATIONS

Mathilde Caron et al.; "Emerging Properties in Self-Supervised Vision Transformers, Computer Vision and Pattern Recognition"; May 24, 2021.

\* cited by examiner

1100 —↘

┌─────────────────────────────────────────────────────────────┐
│ perform some or all steps in FIG. 10 to derive a ROI on a   │
│ candidate slide at a first magnification level, wherein the first │
│ magnification level is set as a first value lower than a target │
│ magnification level 1102                                    │
└─────────────────────────────────────────────────────────────┘
                              │
                              ▼
┌─────────────────────────────────────────────────────────────┐
│ perform some or all steps in FIG. 10 to derive the ROI on the │
│ candidate slide at the first magnification level, wherein the first │
│ magnification level is set as a second value higher than the first │
│ value, and a second magnification level is set as the first value 1104 │
└─────────────────────────────────────────────────────────────┘

FIG. 11

APPARATUS AND A METHOD FOR ON-DEMAND REGISTRATION OF WHOLE SLIDE IMAGES

CROSS-REFERENCE TO RELATED APPLICATIONS

This application claims the benefit of priority of U.S. Provisional Patent Application Ser. No. 63/508,785, filed on Jun. 16, 2023, and titled "SYSTEMS AND METHODS FOR ON-DEMAND REGISTRATION OF WHOLE SLIDE IMAGES," which is incorporated by reference herein in its entirety.

FIELD OF THE INVENTION

The present invention generally relates to the field of digital pathology. In particular, the present invention is directed to an apparatus and a method for on-demand registration of whole slide images (WSIs).

BACKGROUND

Histological analysis of tissue specimens is used to evaluate the pathology of various kinds of diseases. Examination of histological slides using a microscope is a classically used method to study these disorders. However, this time-consuming and limited practice has been gradually replaced by emerging technologies such as whole slide imaging. Whole slide imaging is the scanning of glass slides in order to produce digitized versions of the slides. With such advantages as easy image accessibility, storage, wide field of view and high resolution, whole slide imaging is widely used by pathology and educational departments worldwide. However, whole slide imaging poses challenges during the visual examination of the digitized slides. Accordingly, there is a desire for improved techniques for examination of digitized slides.

SUMMARY OF THE DISCLOSURE

In an aspect, an apparatus for on-demand registration of whole slide images (WSIs) is described. The apparatus includes at least a processor and a memory communicatively connected to the at least a processor, wherein the memory contains instructions configuring the at least a processor to receive, at least two digital images taken at a first magnification level, wherein the at least two digital image include a first digital image of a reference slide and a second digital image of a candidate slide, identify a first region of interest (ROI) on the first digital image at a target magnification level, register at least a portion of the second digital image to at least a portion of the first digital slide image at the first magnification level to derive a transformation matrix, apply the transformation matrix to the first ROI on the first digital image to identify a second ROI on the second digital image at the first magnification level, map the second ROI on the second digital image to a corresponding second ROI on the second digital image at the target magnification level, and register the corresponding second ROI on the second digital image to the first ROI on the first digital image at the target magnification level.

In another aspect, a method for on-demand registration of whole slide images (WSIs) is described. The method includes receiving, by at least a processor, at least two digital image taken at a first magnification level, wherein the at least two digital image includes a first digital image of a reference slide and a second digital image of a candidate slide, identifying, by the at least a processor, a first region of interest (ROI) on the first digital image at a target magnification level, registering, by the at least a processor, at least a portion of the second digital image to at least a portion of the first digital slide image at the first magnification level to derive a transformation matrix, applying, by the at least a processor, the transformation matrix to the first ROI on the first digital image to identify a second ROI on the second digital image at the first magnification level, mapping, by the at least a processor, the second ROI on the second digital image to a corresponding second ROI on the second digital image at the target magnification level, and registering, by the at least a processor, the corresponding second ROI on the second digital image to the first ROI on the first digital image at the target magnification level.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 11 illustrates a simplified diagram of a method for identifying a ROI on a candidate slide corresponding to the ROI on the reference slide, each at the target magnification level, in accordance with certain embodiments of the present disclosure;

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and a method for on-demand registration of whole slide images (WSIs), wherein the apparatus includes at least a processor and a memory communicatively connected to the at least a processor, wherein the memory contains instructions configuring the at least a processor to receive, at least two digital images taken at a first magnification level, wherein the at least two digital image include a first digital image of a reference slide and a second digital image of a candidate slide, identify a first region of interest (ROI) on the first digital image at a target magnification level, register at least a portion of the second digital image to at least a portion of the first digital slide image at the first magnification level to derive a transformation matrix, apply the transformation matrix to the first ROI on the first digital image to identify a second ROI on the second digital image at the first magnification level, map the second ROI on the second digital image to a corresponding second ROI on the second digital image at the target magnification level, and register the corresponding second ROI on the second digital image to the first ROI on the first digital image at the target magnification level. Exemplary embodiments illustrating aspects of the present disclosure are described below in the context of several specific examples.

Figure 1:
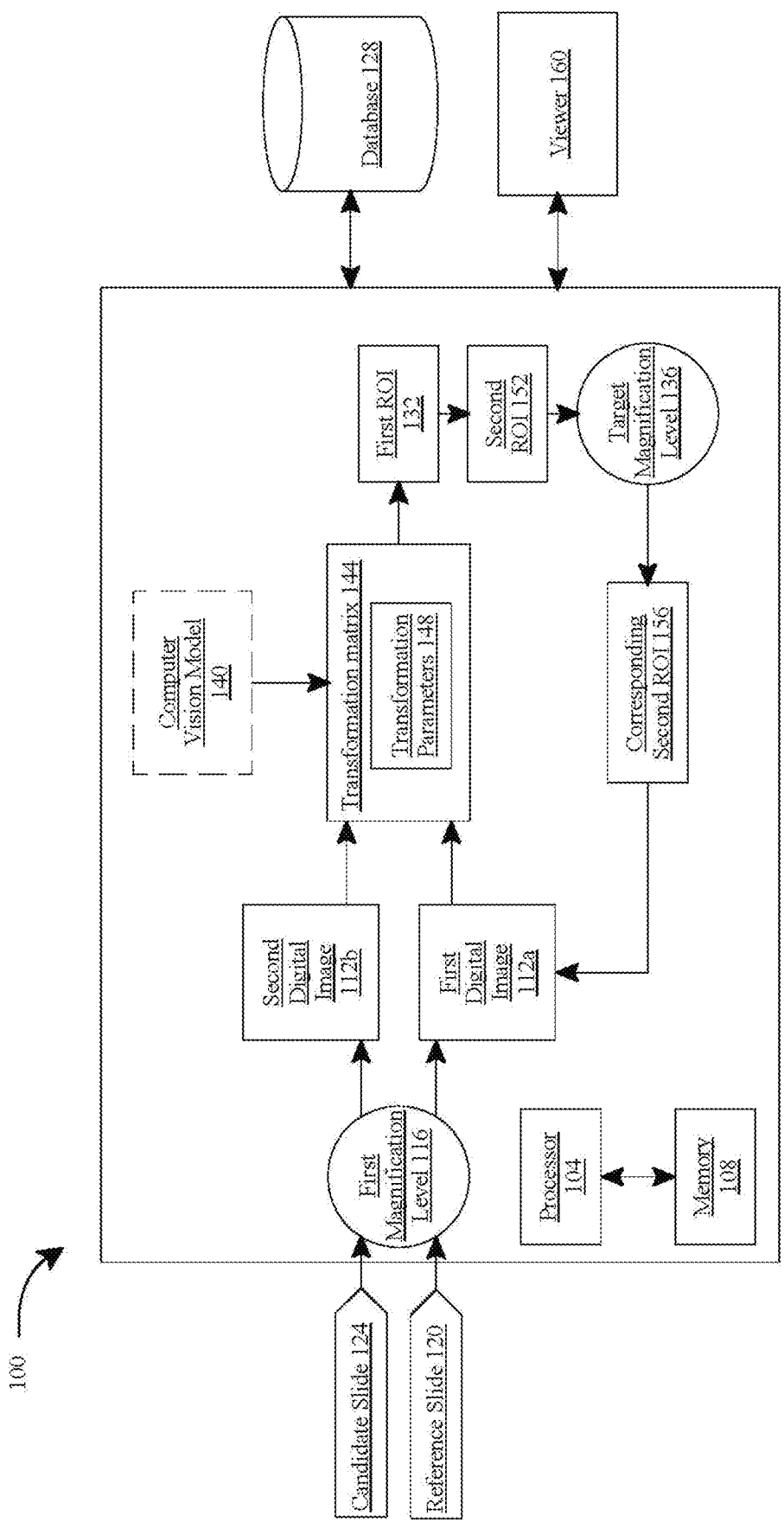
FIG. 1 is a block diagram of an exemplary embodiment of an apparatus for on-demand registration of whole slide images (WSIs)

Referring now to FIG. 1, an exemplary embodiment of an apparatus 100 for on-demand registration of whole slide images (WSIs) is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory 108. Memory 108 is communicatively connected to processor 104. Memory 108 may contain instructions configuring processor 104 to perform tasks disclosed in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 is configured to receive at least two digital images 112a-b taken at a first magnification level 116. As used in this disclosure, a "digital image" is a representation of a two-dimensional (2D) image stored in a digital format. Exemplary digital format may include, without limitation, bitmap, JPEG, PNG, TIFF, or the like. In some embodiments, digital image may include images acquired through a scanning process of physical glass slides (e.g., histological slides) using a whole slide scanner which converts physical slides into high-resolution digital formats suitable for detail analysis and manipulation as described in further detail below.

With continued reference to FIG. 1, as used in this disclosure, a "slide" is a container or surface for holding a specimen. A "specimen," for the purpose of this disclosure, is a sample of organic material used for testing or observation purposes. In one or more embodiments, specimen may include a pathology sample. For instance, and without limitation, a specimen may include a sample of interest, including tissue, plasma, or fluid from an individual. In some cases, specimen may have a different thickness or depth at various locations along specimen. For example, and without limitation, specimen may have a first thickness t at a first location x, a second thickness t' at a second location x', and a third thickness t" at a third location x".

With continued reference to FIG. 1, in some embodiments, slide may include a formalin fixed paraffin embedded slide. In some embodiments, specimen on slide may be stained. In some embodiments, slide may be substantially transparent. In some embodiments, slide may include a thin, flat, and substantially transparent glass slide. In some embodiments, a cover, such as a transparent cover, may be applied to slide such that specimen is disposed between slide and cover. For example, and without limitation, specimen may be compressed between slide and corresponding cover.

With continued reference to FIG. 1, as described herein, a "magnification level" is a specific degree of enlargement used during the scanning or imaging of the slide. In an embodiment, first magnification level 116 may include an initial level at which slides are digitized and may be used, in some cases, as a basis for any subsequent imaging processing and registration steps as described in further detail below. As a non-limiting example, first magnification level 116 may include a ratio of the apparent size of specimen in the image to its actual size e.g., 5×, 10×, 15×, 20×, 25×, 30×, 35×, 40×, or the like. In some cases, first magnification level 116 may be determined manually by operators of the scanner, or automatically by at least a processor 104 based on a balance between, for example, and without limitation, image detail and file size, providing sufficient resolution for identifying regions of interests (ROIs) while ensuring manageable data processing and storage requirements of apparatus 100.

With continued reference to FIG. 1, at least two digital images 112a-b includes a first digital image 112a of a reference slide 120. As used in this disclosure, a "reference slide" is a slide that serves as a baseline or standard for comparison. In some embodiments, reference slide 120 may include one or more "known" ROIs that are used to, for example, guide the registration of corresponding regions on other slides e.g., a candidate slide 124. At least two digital images 112a-b includes a second digital image 112b of a candidate slide 124. A "candidate slide", for the purpose of this disclosure, is another slide that is being compared to the reference slide. Candidate slide 124 may be registered against reference slide 120 to align corresponding ROI. In some cases, both reference slide 120 and candidate slide 124 may be stained and prepared; however, candidate slide 124 may be treated with different stains or prepared under different conditions compared to reference slide 120.

With continued reference to FIG. 1, in some embodiments, each digital image of at least two digital images 112a-b may include one or more slides. In some embodiments, the whole slide scanner (not shown in FIG. 1) may scan the slide into any digital format as described above. As a non-limiting example, both reference slide 120 and candidate slide 124 may be a conventional glass slide and each digital image of at least two digital images 112a-b corresponding to both slides respectively may be a whole slide image (WSI). As used in this disclosure, a "whole slide image" is a high-resolution digital representation of an entire slide at multiple magnification levels (e.g., 10×, 20×, 30×, and 40×).

With continued reference to FIG. 1, WSI may include a pyramid structure, wherein the "pyramid structure," as described herein, refers to a hierarchical organization of a digital image where multiple versions of the digital image are stored at different resolutions or magnification levels. In one or more embodiments, pyramid structure may include a plurality of layers; for instance, and without limitation, the base layer (or the bottom of the pyramid structure) may include a highest resolution image capturing the slide in most detail. Each subsequent layer may include, for example, progressively lower resolution versions of the image, representing reduced levels of detail. As a non-limiting example, pyramid structure May include a plurality of magnification levels containing first magnification level 116 and a target magnification level as described in further detail below.

With continued reference to FIG. 1, at least a processor 104 may be communicatively connected to a database 128. At least two digital images 112a-b, in some cases, may be received from database 128 upon querying database 128. Database 128 may store a plurality of digital images. In one or more embodiments, database 128 may be implemented, without limitation, as a relational database, a key-value retrieval database such as a NOSQL database, or any other format or structure for use as a database that a person skilled in the art would recognize as suitable upon review of the entirety of this disclosure. Database 128 may alternatively or additionally be implemented using a distributed data storage protocol and/or data structure, such as a distributed hash table or the like. One or more digital images stored in database 128 may be flagged with or linked to one or more additional elements of information (e.g., image metadata or patient information), which may be reflected in data entry cells and/or in linked tables such as tables related by one or more indices in a relational database. Persons skilled in the art, upon reviewing the entirety of this disclosure, will be aware of various ways in which digital images in a database may store, retrieve, organize, and/or reflect data and/or records as used herein, as well as categories and/or populations of data consistently with this disclosure.

With continued reference to FIG. 1, in some cases, at least a processor 104 may be configured to manage large image files e.g., digital images more efficiently by storing them in pyramid structure. For instance, lower resolution layer of a digital image may require less storage space and may be accessed quickly for broader overviews, while higher resolution layers may be used for detailed analysis. User may, in some cases, zoom in and out seamlessly within digital image with pyramid structure. As a non-limiting example, when user zooms in, at least a processor 104 may retrieve, from database 128, higher resolution data from the appropriate layer of the pyramid. Conversely, when zooming out, lower resolution data may be retrieved instead.

With continued reference to FIG. 1, in some cases, WSI may be created by first capturing, using a whole slide scanner, a highest resolution image, and then generate one or more lower resolution versions of the highest resolution image via downsampling technique. Different solution images may be organized into pyramid structure for efficient storage and/or access. In some cases, at least two digital images 112a-b may be stored to database 128 and/or transmit from database 128 to at least a processor 104 through a network. In one or more embodiments, security measures such as encryption, authentication (including multi-factor authentication), SSL, HTTPS, and other security techniques may also be applied.

With continued reference to FIG. 1, at least a processor 104 is configured to identify a first region of interest (ROI) 132 on first digital image 112a at a target magnification level 136. As used in this disclosure, a "region of interest (ROI)" is a specific area or subset of a digital image that is selected for detailed analysis or processing. A "target magnification level," for the purpose of this disclosure, is a specific degree of magnification at which the first ROI is identified and analyzed. In some cases, target magnification level 136 may be higher than first magnification level 116 used for initial image capture. In some embodiments, identifying first ROI 132 may include pinpointing a specific area on reference slide 120 that contains, for example, and without limitation, a specimen for at least a portion of the specimen in question or other critical information for subsequent analysis and registration. In some cases, first ROI 132 may be examined at target magnification level 136.

With continued reference to FIG. 1, in some embodiments, target magnification level 136 may be higher than a lowest magnification level of a pyramid (e.g., when the pyramid includes images having 0.3, 2.5, and 10× magnification, the target magnification level may be 2.5× or 10×). Nevertheless, apparatus 100 and methods described herein may leverage the richer topographical information available at lower magnification levels to improve the accuracy and efficiency of the registration at target magnification level 136. In some embodiments, first ROI identification may be a manual process; for instance, a user may specify reference slide 120, first ROI 132 on reference slide 120, and target magnification level 136 based on user's needs. In some cases, reference slide 120 and candidate slide 124 may be serial section slides derived from the same tissue block of the same patient. In some cases, the user may make such selections on a viewer as described in further detail below.

As a non-limiting example, the user may make such selection on a user interface. Illustratively, the user interface may allow the user to draw a box around (or otherwise select) a portion of an image at a target magnification level on the reference slide. The selected area may be first ROI 132 on the reference slide.

With continued reference to FIG. 1, in some embodiments, first ROI 132 may be the whole reference slide 120 at target magnification level 136. In some embodiments, first ROI 132 may be a portion of reference slide 120 at target magnification level 136. As a non-limiting example, first ROI 132 may be the portion of reference slide 120 displayed in a viewer, or a specified region of reference slide 120 displayed in the viewer.

With continued reference to FIG. 1, in other embodiments, apparatus 100 may automatically analyze first digital image 112a of reference slide 120 captured, for example, at 5×, using one or more supervise machine learning algorithms trained on labeled data to automatically identify, for example, a "suspicious region" at a pre-defined, target magnification level, such as 10×, making it as first ROI 132. As a non-limiting example, identifying first ROI 132 on first digital image 112a may include training a computer vision model 140 using training data, wherein the training data may include a plurality of digitized histological slide images at a plurality of magnificent levels as input correlated to a plurality of ROIs as output, and identifying first ROI 132 as a function of first digital image 112a using the trained computer vision model 140.

With continued reference to FIG. 1, as used in this disclosure, a "computer vision model" is a type of artificial intelligence (AI) or machine learning (ML) model designed to perform one or more computer vision tasks. "Computer vision," as used in this disclosure is defined as a field of artificial intelligence (AI) enabling computing device to derive information from visual data such as images and/or videos. Exemplary computer vision tasks may include, without limitation, feature extraction, image/video interpretation, image/video analysis, and the like. In an embodiment, computer vision model 140 may be configured to receive one or more digital images at a first magnification level and output one or more digital images or ROIs at a second magnification level.

With continued reference to FIG. 1, during execution of processing pipeline, at least a processor 104 may execute computer vision model 140. In some cases, training data of computer vision model 140 be labeled; for instance, each digitized image may be annotated with a correct output, such as, without limitation, a location of ROI. In some cases, computer vision model 140 may learn to recognize patterns and features associated with inputs and outputs, for example, via one or more iterations of backpropagations, where model's parameters may be adjusted to minimize the error between its predictions and the actual labels. As a non-limiting example, computer vision model 140 may include a configuration, which defines a plurality of layers of computer vision model 140 and the relationships among the layers. Computer vision model may include a convolutional neural networks (CNNs), recurrent neural networks (RNNs), transformers, or the like. Illustrative examples of layers include input layers, output layers, convolutional layers, densely connected layers, merge layers, and the like. In some embodiments, computer vision model 140 may be configured as a deep neural network with at least one hidden layer between the input and output layers. Connections between layers can include feed-forward connections or recurrent connections.

With continued reference to FIG. 1, one or more layers of computer vision model 140 may be associated with one or more trained model parameters, wherein the "trained model parameters," as described herein, are a set of parameters (e.g., weight and bias parameters of artificial neurons) that are learned from training data according to one or more machine learning process as described herein. In some embodiments, the computer vision model 140 may be the supervised vision model or self-supervised vision model. During the machine learning process, labeled training data may be provided as an input to computer vision model 140, and the values of trained model parameters may be iteratively adjusted until the predictions generated by computer vision model 140 to match the corresponding labels with a desired level of accuracy. In some cases, training data may be transmitted from database 128. Additionally, or alternatively, for improved performance, at least a processor 104 may execute computer vision model 140 using one or more GPUs, tensor processing units, applications-specific integrated circuits, or the like.

With continued reference to FIG. 1, As a non-limiting example, at least a processor 104 may execute trained computer vision model 140 to transform digital images according to a specified requirement. In some embodiments, at least a processor 104 may be configured to receive an input from a viewer, and the input may include the choice of first digital image 112 of reference slide 120, the choice of second digital image 112 of candidate slide 124, a region of interest (ROI), and/or target magnification level 136.

With continued reference to FIG. 1, at least a processor 104 may be configured to update the training data of the computer vision model 140 using user inputs. A computer vision model 140 may use user input to update its training data, further improving its performance, speed, and accuracy. In embodiments, computer vision model 140 may be iteratively updated using input and output results of past iterations of the computer vision model 140. The computer vision model 140 may then be iteratively retrained using the updated training data. For instance, and without limitation, computer vision model 140 may be trained using a first training data from, for example, and without limitation, training data from a user input or database 128. The computer vision model 140 may then be updated by using previous inputs and outputs from the computer vision model 140 as second set of training data, in addition to the first set of training data, to then retrain a newer iteration of computer vision model 140 iteratively. In some cases, when users interact with the viewer, their actions, preferences, and feedback provide valuable information that may be used to refine and enhance any machine learning model as described herein.

With continued reference to FIG. 1, additionally, or alternatively, incorporating user feedback may include updating the training data by removing or adding correlations of user data to a path or resources as indicated by the feedback. Any machine-learning model as described herein may have corresponding training data updated over time based on such feedback or data gathered using any method described herein. For example, and without limitation, when correlations in training data are based on outdated information, at least a processor 104 may update such correlations based on more recent data from database 128 or additional user inputs.

With continued reference to FIG. 1, at least a processor 104 may use user feedback to train computer vision model 140 as described above. For example, computer vision model 140 may be trained using past inputs and outputs. In some embodiments, if a user feedback indicates that an output ROI was "unfavorable," then that output and the corresponding input may be removed from second set of training data used to retrain computer vision model 140, and/or may be replaced with a ROI manually selected by the user that represents an ideal ROI on corresponding digital image (i.e., the input computer vision model 140 originally received), permitting use in retraining, and adding to training data.

With continued reference to FIG. 1, at least a processor 104 is configured to register at least a portion of second digital image 112b to at least a portion of first digital slide image 112a at first magnification level 116 to derive a transformation matrix 144. As used in this disclosure, a "transformation matrix" is a mathematical construct used to perform geometric transformations on a given image. Exemplary geometric transformations may include, without limitation, translation, rotation, scaling, shearing, and the like. In some embodiments, during image registration, transformation matrix 144 may be used to define, for instance, and without limitation, how one image e.g., at least a portion of second digital image 112b needs to be adjusted, to align with another image e.g., at least a portion of first digital image 112a. Exemplary embodiments of transformation matrix 144 are described in further detail below.

With continued reference to FIG. 1, in one or more embodiments, transformation matrix 144 may include a plurality of transformation parameters 148 to align at least a portion of second digital image 112b to at least a portion of first digital image 112a at first magnification level 116. "Transformation parameters," as described herein, are values used in transformation matrix to perform geometric adjustments on an image. In an embodiments, transformation parameters 148 may include translation parameters used to shift image along a give x and y axes. In another embodiment, transformation parameters 148 may include a rotation parameter configured to rotate image around a specific point at a specific angle of rotation. In yet another embodiment, transformation parameters 148 may include a scaling parameter used to adjust the size of the image. In some cases, scaling may be uniform (e.g., same factor for both aces) or, in other cases, non-uniform (e.g., different factors for the x and y axes). In yet another embodiment, transformation parameters 148 may include a shearing parameter configured to distort image by, for instance, slanting it along the x or y axis. As a person skilled in the art, upon reviewing the entirety of this disclosure, will be aware of various transformation parameters 148 incorporated within transformation matrix 144.

With continued reference to FIG. 1, as a non-limiting example, a portion of candidate slide 124 may be registered to a portion of reference slide 120 to calculate, by at least a processor 104, a transformation matrix. Both candidate slide 124 and reference slide 120 may be at a baseline magnification level, for example, first magnification level 116 which is lower than the target magnification level 136. In some embodiments, first magnification level 116 may be a default magnification level of the digital slide (e.g., WSI). For example, and without limitation, the baseline magnification level may be 0.3×.

With continued reference to FIG. 1, registering a portion of second digital image 112b to a portion of first digital image 112a at first magnification level 116 may be done using computer vision model 140 as described above. In some cases, it may be easier for computer vision model 140 to register portions of two slides at a low magnification level (e.g., 0.3×), than to register them at a high magnification level (e.g., 10×). For example, and without limitation, it may be hard for computer vision model 140 to register a portion of the candidate slide to a portion of the reference slide at target magnification level 136 in one shot, while it is relatively easy for the computer vision model 140 to register two slides at a magnification level lower than the target magnification level 136 (e.g., the first magnification level 116). However, it should be noted that transformation matrix 144 derived by registering two slides at the lower magnification level may still be helpful to register these two slides at the high magnification level, the details of which is to be described below.

With continued reference to FIG. 1, in some embodiments, the registration may be rigid. For example, rigid registration may include affine transformation involving identification of key points (e.g., the points with gradients in two orthogonal directions) and descriptors (e.g., feature vector invariant to translation, rotation, and scale) on first ROI 132 on first digital image 112*a* of the reference slide 120 and corresponding second ROI on the second digital image 112*b* of the candidate slide 124. Then the affine transformation may identify the correspondences by matching key points across two slides 120 and 124 using distance between descriptors. Finally, affine transformation may perform in-plane rotation, scale, skew, and translation to derive transformation matrix 144. For example, and without limitation, transformation matrix 144 may include a 2×3 matrix representing 6 degrees of freedom (DoF). For the purposes of this disclosure, an "affine transformation" is a linear mapping method that preserves points, straight lines, and planes.

With continued reference to FIG. 1, as a non-limiting example, using the matched portions of the slides, at least a processor 104 may calculate one or more aforementioned transformation parameters. For instance, at least a processor 104 may determine that candidate slide 124 needs to be shifted 10 units right and 5 units up (translation), rotated by 15 degrees (rotation), and scaled by 1.1 in both direction (scaling). At least a processor 104 may then construct, as a function of the determined transformation parameters, below transformation matrix 144:

$$T = \begin{bmatrix} \cos(\theta) & -\sin(\theta) & tx \\ sine(\theta) & \cos(\theta) & ty \\ 0 & 0 & 1 \end{bmatrix}$$

Wherein tx=10, ty=5, and θ=15°. People skilled in the art will appreciate that some or all information in the transformation matrix 144 derived from registering two slides at a low magnification level (e.g., the first magnification level 116) may be used to register the same two slides at higher magnification levels (e.g., target magnification level 136). For example, the in-plane rotation degree at the first magnification level 116 should be similar to or even same as that at the target magnification level 136.

With continued reference to FIG. 1, in some embodiments, a portion of reference slide 120 may include the whole slide (e.g., the whole panorama) at first magnification level 116. In some embodiments, a portion of reference slide 120 may include the whole slide presented in a viewer (e.g., the mini-panorama, sub-regions) at first magnification level 116. For example, the whole slide presented in the viewer may include first ROI 132 on reference slide 120. In some embodiments, a portion of reference slide 120 may include first ROI 132 on reference slide 120 at the first magnification level 116. Compared with registration techniques which register the whole panorama, which causes unnecessary computation time and high storage space, the techniques described in the current disclosure may use a portion of the slide for registration, wherein the portion of the slide may include reference slide 120 presented in a viewer, or even first ROI 132 on reference slide 120. As such, the current disclosure may further reduce computation time and storage space, thus delivering a better user experience.

With continued reference to FIG. 1, at least a processor 104 is configured to apply transformation matrix 144 to first ROI 132 on first digital image 112*a* to identify a second ROI 152 on second digital image 112*b* at first magnification level 116. In some cases, applying transformation matrix 144 may include mapping the coordinates of first ROI 12 on reference slide 120 to candidate slide 124. Such mapping may identify a corresponding region i.e., second ROI 152 on candidate slide 124. At least a processor 104 may load both first digital image 112*a* and second digital image 112*b* into memory 108 and ensure both digital images are accessible at first magnification level 116. Applying transformation matrix 144 to first ROI 132 may include extracting one or more coordinates of first ROI 132 from first digital image 112*a* which define boundaries of first ROI 132, for example, and without limitation, top-left and bottom-right corners, or a set of points outlining first ROI 132. Coordinates may be represented, in some cases, in a homogeneous coordinate system to facilitate matrix multiplication. As a non-limiting example, a point (x, y) may be represented as (x, y, 1).

With continued reference to FIG. 1, in some cases, transformation matrix 144 may be applied to first ROI 132 on reference slide 120 to derive second ROI 152 on candidate slide 124 at target magnification level 136. In some cases, the transformation matrix 144 may be used to identify second ROI 152 on candidate slide 124 at target magnification level by performing, for instance, and without limitation, in-plane rotation, scale, skew, translation, and the like to derive second ROI 152 on candidate slide 124 at target magnification level 136. In some embodiments, if output magnification level is set as target magnification level 136, transformation matrix 144 may be used to identify second ROI 152 on the candidate slide at target magnification level 136. Apparatus 100 and methods described herein include identification of a ROI on candidate slide 124 at an output magnification level by leveraging richer topographical information available at a lower magnification level. As a non-limiting example, topographical information available at 2.5× may be used to identify a ROI on candidate slide 124 at 5×. When output magnification level is set as target magnification level 136, apparatus 100 and methods described herein may be used to identify a ROI on candidate slide 124 at the target magnification level 136.

With continued reference to FIG. 1, applying transformation matrix 144 to first ROI 132 may include multiplying transformation matrix 144 by each coordinate point of first ROI 132 to obtain corresponding coordinates on second digital image 112*b*. Such transformation may include, for example, adjustments to its position, orientation, and/or scale of points on transformation parameters 148. As a non-limiting example, for a point $(x_1, y_1)$ in first ROI 132, transformed point $(x_2, y_2)$ on second digital image 112*b* may be calculated as follows:

$$\begin{bmatrix} x_2 \\ y_2 \\ 1 \end{bmatrix} = \begin{bmatrix} a & b & tx \\ c & c & ty \\ 0 & 0 & 1 \end{bmatrix} \begin{bmatrix} x_1 \\ y_1 \\ 1 \end{bmatrix}$$

Wherein the multiplication may yield a new coordinate ($x_2$, $y_2$) that define the position of second ROI 152 on candidate slide 124. In some cases, all transformed points defining the boundaries of second ROI 152 on second digital image 112b may be collected, by at least a processor 104, and second ROI 152 containing a region delineated by the transformed points that corresponds to first ROI 132 on reference slide 120 may be selected on second digital image 112b at first magnification level 116.

With continued reference to FIG. 1, in some embodiments, to identify second ROI 152 on candidate slide 124 at target magnification level 136, output magnification level may be set directly as the target magnification level 136. In some cases, processes of identifying first ROI 132 on reference slide 120, registering a portion of candidate slide 124 to a portion of reference slide 120 at a lower magnification level to derive transformation matrix 144, and applying transformation matrix 144 to first ROI 132 to identify second ROI 152 on candidate slide 124 at a higher magnification level may be made optional, and some or all rest processes described above may be performed only once. As such, the output will be second ROI 152 on candidate slide 124 at target magnification level 136, thus, at least in part, saving computation time and storage space.

With continued reference to FIG. 1, in other embodiments, both second ROI 152 on candidate slide 124 and first ROI 132 on reference slide 120 are at target magnification level 136. User may specify the candidate slide 124 based on his needs; for example, and without limitation, user may choose an Immunohistochemistry (IHC) stained slide as candidate slide 124. As another non-limiting example, since different dyes may be used to help identify different types of cells and tissues and provides important information about the pattern, shape, and structure of cells in a tissue sample, user may choose a slide stained with one dye as the reference slide and choose a slide stained with another dye as candidate slide 124.

With continued reference to FIG. 1, at least a processor 104 is configured to map second ROI 152 on second digital image 112b to a corresponding second ROI 156 on second digital image 112b at target magnification level 136. Prior to mapping, second digital image 112b of candidate slide 124 may be available at both first magnification level 116 and target magnification level 136. At least a processor 104 may have, for instance, coordinates and dimensions of second ROI 152 at first magnification level loaded in memory 108. In one or more embodiments, at least a processor 104 may be configured to calculate a scaling factor between first magnification level 116 and target magnification level 136 to determine how much image size changes when moving from one magnification level to another. As a non-limiting example, if first magnification level $M_1$ is 10× and target magnification level $M_2$ is 20×, scaling factor S may be defined as $$S = \frac{M_2}{M_1} = \frac{20}{10} = 2.$$

In some cases, at least a processor 104 may be configured to perform coordinate transformations, for example, and without limitation, by applying the calculated scaling factor to the coordinates of second ROI 152 to map it to target magnification level 136.

With continued reference to FIG. 1, although it may be ideal to derive second ROI 152 on candidate slide 124 directly at target magnification level 136 in one shot; however, it may be difficult for computer vision model 140 to register portions of two slides at a high magnification level (e.g., target magnification level 136) directly, as explained above. This is specially the case when target magnification level 136 is high (e.g., 10×) as the digital image at this level may contain a lower amount of tissue on the slide for the registration process. Hence there is a need to repeat some, or all processing steps as described above by leveraging one or more intermediate magnification levels in the pyramid structure of image.

With continued reference to FIG. 1, in some cases, some or all of the processing steps as described above may be repeated. As such, second ROI 152 on candidate slide 124 as each iteration's output will be at a higher magnification level than the previous one's magnification level, thus second ROI 152 at target magnification level 136 may be finally derived. In other words, apparatus 100 and method described herein may take a bottom-up approach by first identifying second ROI 152 on candidate slide 124 at a low magnification level, then iteratively identifying corresponding second ROIs 152 at a plurality of rising magnification levels, and finally reaching target magnification level 136. For example, and without limitation, suppose target magnification level 136 is 10×, second ROI 152 on candidate slide 124 in the first iteration may be at 2.5×, second ROI 152 in the second iteration may be at 5×, and finally, second ROI 152 in third and last iteration may be at 10×. In some embodiments, first magnification level 116 may be the default magnification level of the digital image (e.g., WSI). For example, the default magnification level may be 0.3×.

With continued reference to FIG. 1, in some embodiments, first ROI 132 on reference slide 120 at output magnification level (e.g., target magnification level 136) may be identified by mapping first ROI 132 on reference slide 120 at a first value to corresponding region on reference slide 120 at a second value. In some cases, first magnification level 116 may be set as first value and target magnification level 136 may be set as second value. For example, and without limitation, first magnification level may be set as 2.5×. Since the portion of candidate slide 124 at first value is the output of at least a processor 104, it may be readily available for being registered to the portion of reference slide 120 at the same value, thus, at least in part, saving the trouble for finding a new portion of candidate slide 124 at such magnification level.

With continued reference to FIG. 1, at least a processor 104 is configured to register corresponding second ROI 156 on second digital image 112b to first ROI 132 on first digital image 112a at target magnification level 136. As described herein, "image registration" is a process of transforming different sets of data into one coordinate system. In the context of WSIs, image registration may include, without limitation, candidate slide 124 (i.e., second digital image 112b) with reference slide 120 (i.e., first digital image 112a) so that corresponding regions e.g., first ROI 132 and second ROI 152 may overlap accurately. Second ROI 152 and first ROI 132, both at target magnification level 136, may be loaded into memory 108 and at least a processor 104 may employ, for example, one or more feature detection algorithms (implemented using computer vision model 140) to identify one or more key points or landmarks within both ROIs. Exemplary feature detection algorithms may include, without limitation, Scale-Invariant Feature Transform (SIFT), Speeded-Up Robust Features (SURF), Oriented FAST, Rotated BRIEF (ORB), and the like.

With continued reference to FIG. 1, as a non-limiting example, detected features in first ROI 132 may be matched with corresponding features in second ROI 152. At least a processor 104 may be configured to find pairs of features that are most similar between at least two digital images 112a-b based on descriptors. Transformation parameters 148 may be estimated, based on the pairs of features, and transformation matrix 144 may be constructed to align corresponding second ROI 156 and first ROI 132 at target magnification level 136. As described above, this may include calculating the translation, rotation, scaling, and any other necessary transformations. At least a processor 104 may adjust, based on estimated transformation parameters 148 the position, orientation, and scale of corresponding second ROI 156 to match first ROI 132 at target magnification level 136.

With continued reference to FIG. 1, at least a processor 104 may utilize a "brute force" registration technique to register corresponding second ROI 156 on second digital image 112b to first ROI 132 on first digital image 112a at target magnification level 136. As described above, at least a processor 104 may register the whole panorama at all magnification levels of the pyramid structure (e.g., the first level, the second level, and the third level as described in FIG. 2B) for all serial section slides. However, as different applications need registration at different magnification levels, such brute force techniques may be limited in practice as they result in unnecessary computation time and high storage space.

With continued reference to FIG. 1, apparatus 100 and methods described herein may allow on-demand registration (e.g., registration at higher magnification levels may be performed in response to a user identifying a particular ROI at those magnification levels), thus, at least in part, saving computation time and storage space. Alternatively, at least a processor 104 may implement a "fixed" registration technique, wherein the fixed registration technique may involve pre-computing registration amongst a fixed set of reference slides and a fixed set of candidate slides. Such techniques may restrict the user's ability to select reference slide 120 and candidate slide 124 on demand.

With continued reference to FIG. 1, as described above, digital image at a lower magnification level may contain richer topographical information (e.g., contours, edges, corners), thus making it easier for a computer program to accurately register candidate slide 124 and reference slide 120. By contrast, it may be inefficient and challenging, if not infeasible, to register candidate slide 124 and reference slide 120 at a higher magnification level (e.g., 10x) due to the larger file sizes and reduced amount of topographical information for on a per-pixel basis. Hence, it is desirable to leverage the topographical information available at lower magnification levels to improve the accuracy and efficiency of the registration at target magnification level 136. This is because the registration information (e.g., translation, rotation, scale) of a specific pair of reference slide 120 and candidate slide 124 is similar across different magnification levels. In some embodiments, corresponding second ROI 156 on candidate slide 124 at target magnification level 136 may be identified based on least one registration between candidate slide 124 and reference slide 120 computed at a lower magnification level (e.g., first magnification level 116) than target magnification level 136. For example, and without limitation, when target magnification level 136 is 10x, registration between candidate slide 124 and reference slide 120 may be computed at 5x. In some embodiments, corresponding second ROI 156 on candidate slide 124 corresponding to first ROI 132 on reference slide 120, both at target magnification level 136, may be identified by performing some or all processes described above.

With continued reference to FIG. 1, in some embodiments, corresponding second ROI 156 on candidate slide 124 may be registered to first ROI 132 in reference slide 120, wherein both ROIs are at target magnification level 116; however, in some cases, corresponding second ROI 156 on candidate slide 124 at target magnification level 136 may still need to be registered with first ROI 132 on reference slide 120, because it is still likely that second ROI may be oriented to a certain degree or deformed on the slide at target magnification level 136.

With continued reference to FIG. 1, in some cases, registration may be performed by computer vision model 140 that is trained to register first ROI 132 on reference slide 120 to a corresponding second ROI 156 on candidate slide 124 or vice versa. In some embodiments, computer vision model 140 may be executed using specialized computing hardware, such as one or more GPUs or application-specific integrated circuits (ASIC) as described above. In some embodiments, computer vision model 140 may be a pre-trained computer vision model. For example, and without limitation, computer vision model may be trained with a plurality of ROI on a plurality of reference slides and a plurality of corresponding ROIs on a plurality of candidate slides at different magnification levels.

With continued reference to FIG. 1, in a non-limiting embodiment, at least a processor 104 may be configured to perform a rigid registration to register corresponding second ROI 156 on second digital image 112b to first ROI 132 on first digital image 112a. As used in this disclosure, a "rigid registration" is a type of image registration technique where the transformation applied to align one image with another is limited to translation and rotation, without allowing for scaling or shearing. Both ROIs may be spatially aligned, at target magnification level 136, using rigid registration without altering their shape or size. Example techniques for rigid registration may include geometric transformation (e.g., corners detection, contours detection) and machine learning/deep learning transformation (e.g., partial-affine transformation).

With continued reference to FIG. 1, for example, and without limitation, object detection or object recognition using computer vision model 140 may involve detecting the existence of an object or multiple objects, their categories, and their locations. As one application of object detection technology, segmentation may be used to identify clusters of pixels in the image representation that correspond to the same entity. Segmentation may be used to identify the contour of an apple, a car, a person, etc. Illustratively, segmenting the image representation of an object may include figuring out the bounding path (e.g., contour) of the object. Accordingly, computer vision model 140 may be trained to identify the bounding path of the object. An example of a computer vision model that can identify the bounding path of an object in this manner is the DINO model, which is described in Mathilde Caron et. al, *Emerging Properties in Self-Supervised Vision Transformers*, Computer Vision and Pattern Recognition, 2021, which is incorporated by reference herein in its entirety.

With continued reference to FIG. 1, in another non-limiting embodiment, at least a processor 104 may be configured to perform a non-rigid registration to register corresponding second ROI 156 on second digital image 112b to first ROI 132 on first digital image 112a. As described herein, a "non-rigid registration," also known as deformable registration, is a type of image registration technique where the transformation applied to align one image with another allows for local deformations. In contrast with rigid registration, which only permits translation and rotation, non-rigid registration as described herein may accommodate changes in shape and size, enabling the alignment of ROIs on first and second digital images 112a-b, at target magnification level 136, with complex and non-linear variations.

With continued reference to FIG. 1, in some cases, computer vision model 140 may include a built-in transformation model to represent local deformations of images. In some cases, transformation model may include polynomial transformations, spline-based transformations, freeform deformations, and/or the like. At least a processor 104 may be configured to strategically placed within the corresponding second ROI 156 to guide, at target magnification level 136, the deformation process. For example, transformation model may adjust the positions of these control points to align corresponding second ROI 156 to first ROI 132 on first digital image 112a at target magnification level 136. At least a processor 104 may subsequently evaluate, using a similarity measure that quantifies, for example, how well the ROIs are aligned. Exemplary similarity measures may include, without limitation, mutual information, normalized cross-correlation, sum of squared differences, or the like.

With continued reference to FIG. 1, in some embodiments, non-rigid registration may involve mitigate deformation in corresponding second ROI 156 on candidate slide 124 at target magnification level 136. Example techniques for non-rigid registration may include geometric transformation (e.g., point-cloud, optical flow estimation) and machine learning/deep learning transformation (e.g., vector field). For example, the optical flow estimation may be used for non-rigid registration. Optical flow may be used to predict movement between two consecutive images. Optical flow models take two images as input and predict a flow which indicates the displacement of every single pixel in the first image and maps it to its corresponding pixel in the second image.

With continued reference to FIG. 1, additionally, or alternatively, registering corresponding second ROI 156 on candidate slide 124 to first ROI 132 on reference slide 120, both at target magnification level 136, may include both rigid and non-rigid registration as described above. However, the non-rigid transformation is also a computationally costly process. Hence in some embodiments, the non-rigid transformation may be avoided if it is determined that the local distortion in corresponding second ROI 156 on candidate slide 124 at target magnification level 136 that is below a threshold value.

With continued reference to FIG. 1, in cases where ROIs registration is failed, some or all processing steps as described above may be repeated to derive candidate slide 124 at target magnification level 136. As a non-limiting example, apparatus 100 and method as described herein may first try to derive the corresponding second ROI 156 on candidate slide 124 at target magnification level 136 (e.g., 40×), then try to register the corresponding second ROI 156 on candidate slide 124 to first ROI 132 on reference slide 120, each at target magnification level 136. If failed, at least a processor 104 may try to find, for example, a magnification level lower than the target at which the registration is successful (e.g., 1.25×). Apparatus 100 may further perform bottom-up method based on that registration level to finally derive corresponding second ROI 156 on the candidate slide 124 at target magnification level 136. As such, the method strikes a balance between computation time, storage space and user experience.

With continued reference to FIG. 1, at least a processor 104 may be communicatively connected to a viewer 160 generally includes one or more displays (e.g., LED, LCD, CRT, or the like) and user inputs (e.g., keyboard, mouse, trackpad, joystick, or the like). Using the display(s) and user input(s), viewer 160 may provide a user interface (e.g., a local or cloud-based software application and/or a web browser) through which a user can interact with an implementation of the subject matter described herein. For example, the user may input reference slide 120, candidate slide 124, first ROI 132, target magnification level 136, or any settings into the system. In some embodiments, viewer 120 may access and view at least two digital image 112a-b at different magnification levels. In some embodiments, viewer 120 may access and view the processed digital image generated by, for instance, computer vision model 140, at different magnification levels. In some embodiments, viewer 120 may view different biological organizations at different magnification levels. Viewer 120 may be directly coupled to the network; however, it is to be understood that a variety of other arrangements are possible. For example, viewer 120 may be directly coupled to apparatus 100, or the like. Viewer 120 may access digital content from the database 128 via network, or directly from the at least a processor 104. Illustrative examples of a user interface displayed using viewer 120 are described in further detail below with reference to FIG. 3.

Figure 2A:
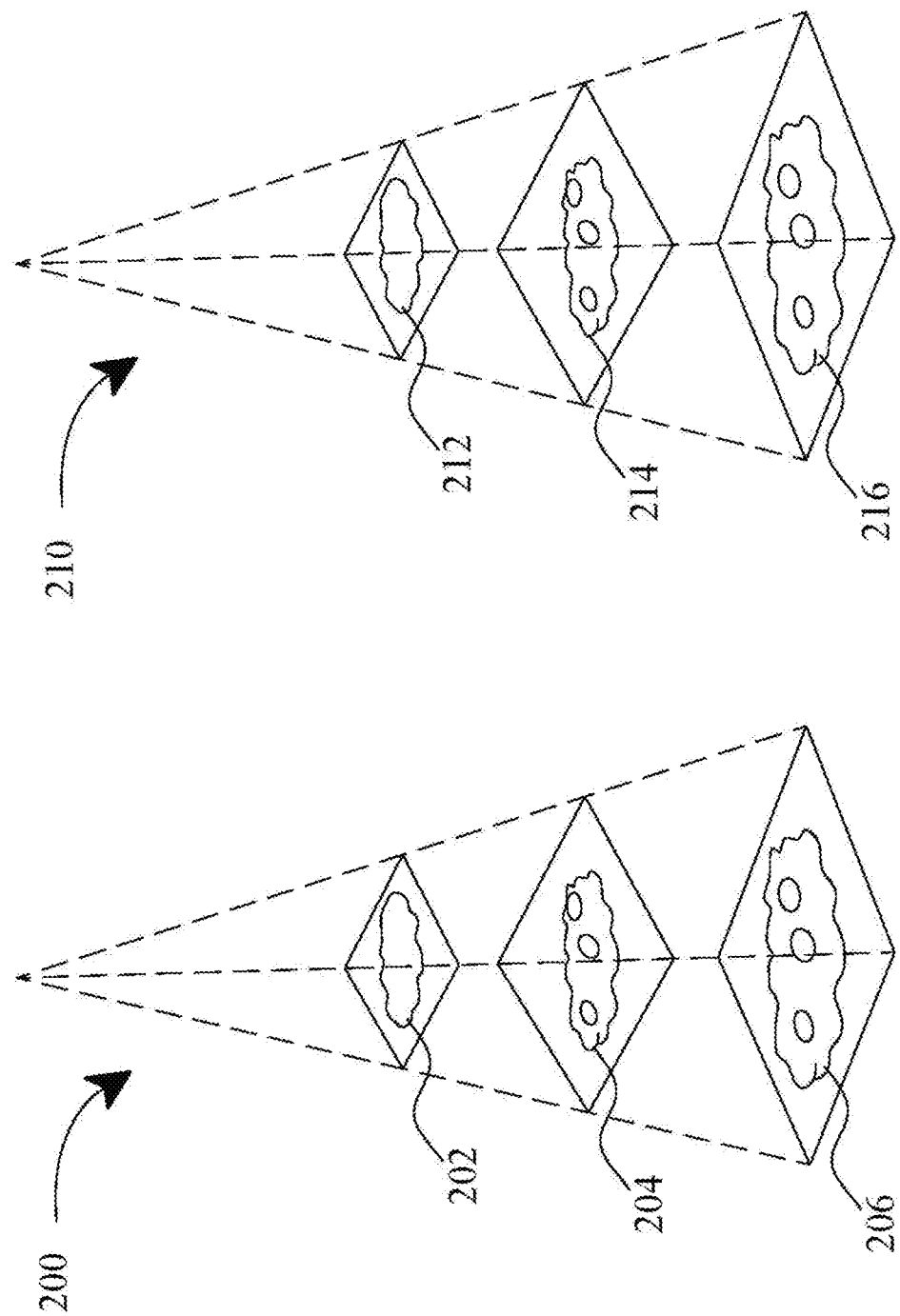
FIG. 2A is an exemplary embodiment of pyramid structures of a first digital image of a reference slide and a second digital image of a candidate slide respectively.

Now referring to FIG. 2A, an exemplary embodiment of pyramid structures of a first digital image of a reference slide and a second digital image of a candidate slide is illustrated. A reference pyramid 200 may represent the pyramid of a reference slide at different magnification levels, and a candidate pyramid 210 may represent the pyramid of a candidate slide at corresponding magnification levels. In some embodiments, the reference slide and the candidate slide may be derived from the serial section slides. In some embodiments, the reference slide and/or the candidate slide may be WSIs.

With continued reference to FIG. 2A, in some cases, the reference slide and the candidate slide may be selected by the user based on needs as described above with reference to FIG. 1. For example, the user may be interested in examining corresponding regions of serial sections from multiple slides images at a target magnification level. The viewer, such as the viewer 120, may be used to view reference slide and/or candidate slide.

With continued reference to FIG. 2A, in some cases, reference pyramid 200 may include multiple magnification levels. For example, the reference pyramid 200 may include 3 magnification levels. At a first level 202, the magnification level may be 0.3×. At a second level 204, the magnification level may be higher than the first level 202. For example, the magnification level may be 2.5×. At a third level 206, the magnification level may be higher than the second level 204. For example, the third level 206 may be 10×. The digital slide at the lower magnification level may display a higher amount of tissue on the slide given a fixed image resolution at each level, which will be described in detail in FIG. 2B below.

With continued reference to FIG. 2A, in some cases, the candidate pyramid 210 may also include corresponding magnification levels. The magnification levels 212-216 may correspond with magnification levels 202-206 respectively and will not be repeated herein for brevity. It is to be understood that magnification levels 202-206 and 212-216 are illustrative only, and the reference pyramid 200 and/or the candidate pyramid 210 many include other magnification levels (or ranges of magnification levels).

Figure 2B:
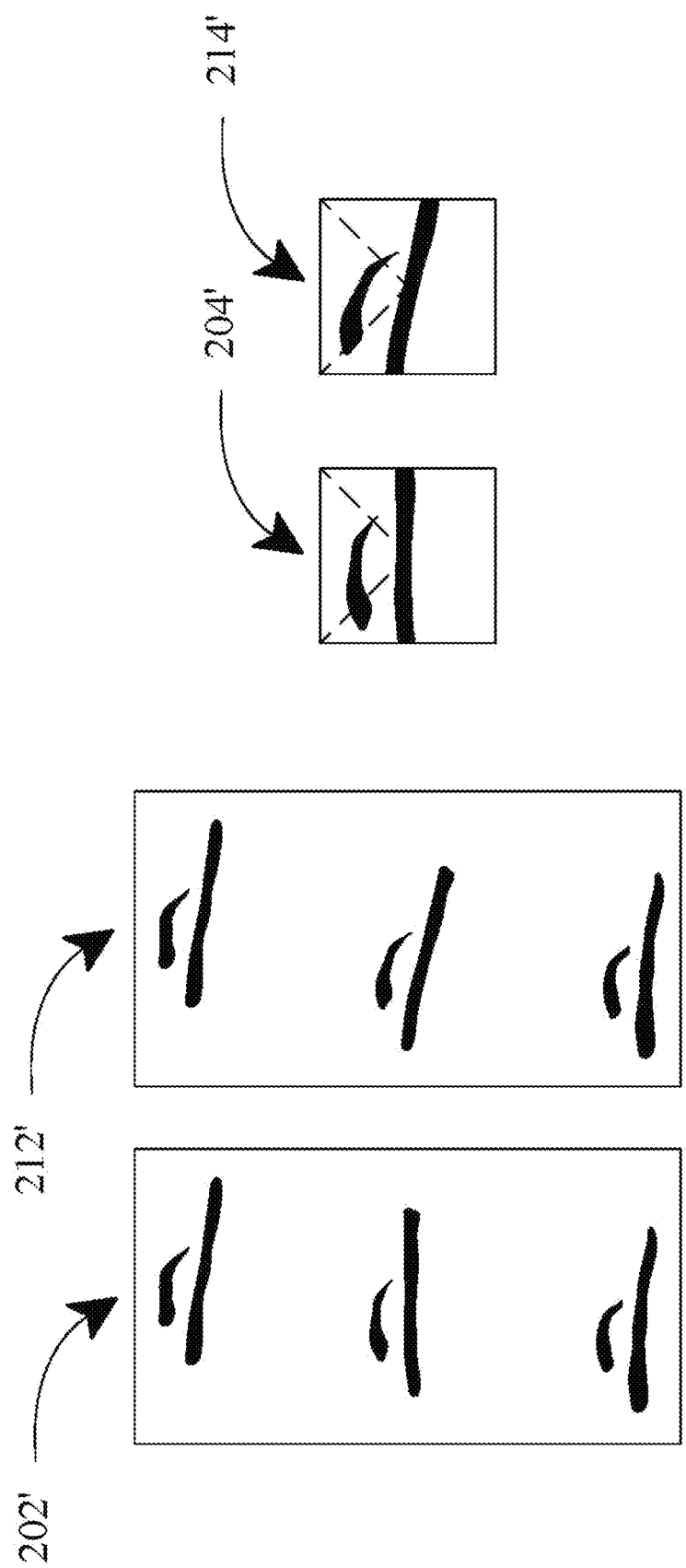
FIG. 2B is an exemplary embodiment of a first digital image of a reference slide and a second digital image of a candidate slide respectively at different magnification levels respectively.

Now referring to FIG. 2B, an exemplary embodiment of a first digital image of a reference slide and a second digital image of a candidate slide respectively at different magnification levels is illustrated. Slide 202' refers to the corresponding reference slide at the first level 202. Slide 204' refers to the corresponding reference slide at the second level 204. In some embodiments, slide 202' may represent the whole reference slide (e.g., the whole panorama) at the first level 202. In some embodiments, slide 202' may represent the whole reference slide presented in the viewer (e.g., the mini-panorama, sub-regions) at the first level 202. In some embodiments, slide 202' may represent the ROI on the reference slide at the first level 202.

With continued reference to FIG. 2B, slide 212' refers to the corresponding candidate slide at the first level 212. Slide 214' refers to the corresponding candidate slide at the second level 214. Slide 212' and slide 214' corresponds to the slide 202' and slide 204' respectively and the details will not be repeated herein for brevity. The user may choose to study a reference slide and/or a candidate slide at a target magnification level specified by the user. The user may study the ROI at the reference slide, and the corresponding ROI at the target slide, each at the target magnification level. For example, the user may choose to study reference slide and/or the candidate slide at the second level 204 (214). In other words, the user may choose to study the slide 204' and the slide 214'. This means that it would be desirable to align (e.g., register) the selected candidate slide (e.g., 204') with respect to a selected reference slide (e.g., 214'), both at the second level 204 (214). As depicted in FIG. 2B, compared with tissue on the slide 204', the tissue on the slide 214' has been oriented to a certain degree.

With continued reference to FIG. 2B, the registration may be desirable for various reasons. For example, when multiple slices of tissue are mounted on serial section slides, they may be oriented to a certain degree on the slide due to various reasons such as surface tension of fluid, human error, etc. As the other example, the slices of tissues may be deformed during this process. However, a digital slide at the lower magnification level may display a higher amount of tissue on the slide when displayed in a viewer. Thus, the richer topographical information (e.g., contours, edges, corners) contained makes it easier for a computer program, such as computer vision model 180 to accurately register the candidate and reference slides. For example, compared with the slide 204' at the second level 204, the slide 202' contains more information (e.g., the information outside of the box corresponding to slide 204') as it is presented in the lower level, the first level 202. The additional topographical information can be used to register the slide 212' to the slide 202', but in general is not available when registering the slide 214' to the slide 204'.

Figure 3:
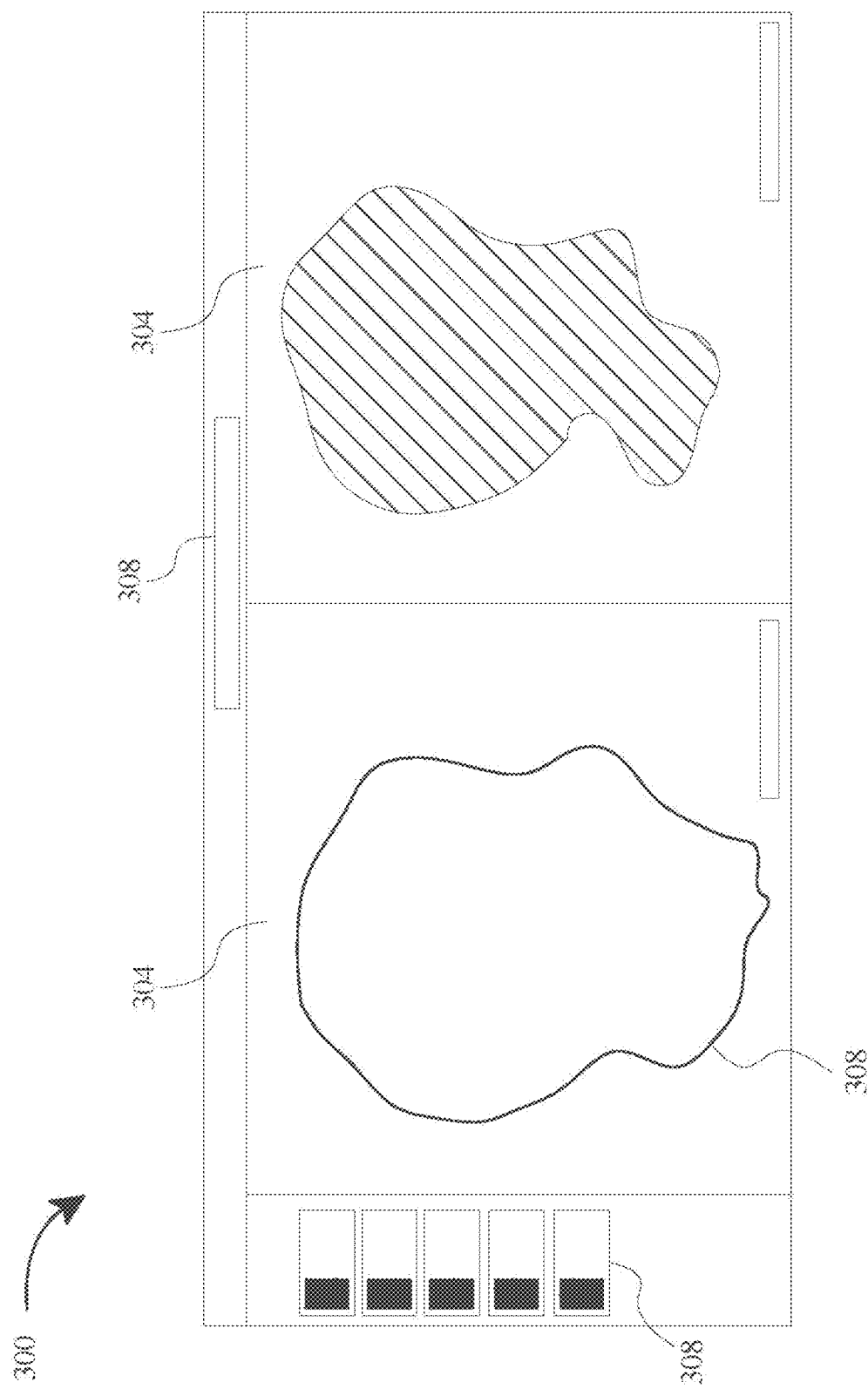
FIG. 3 is an exemplary embodiment of a user interface of a viewer.

Now referring to FIG. 3, an exemplary embodiment of a user interface 300 of a viewer is illustrated. A "user interface," as used herein, is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls.

With continued reference to FIG. 3, user interface 300 may be displayed by a viewer, such as the viewer 160 as described above with reference to FIG. 1. In some embodiments, a user may interact with an implementation of the subject matter described herein via the user interface 300 of the viewer. In some cases, User interface 300 may include one or more display regions 304 and one or more user input regions 308. The display regions 304 may display one or more images. In some embodiments, viewer 160 may access and view the digital image at different magnification levels. In some embodiments, viewer 160 may access and view the processed image generated by apparatus 100 at different magnification levels. A user may use the one or more user input regions 308 to input reference slide, candidate slide, ROI, target magnification level, or any settings into the system. For example, the user may choose the ROI on the reference slide on the user interface. Illustratively, the user interface may allow the user to circle around (or otherwise select) any regions on the reference slide based on his needs.

Figure 4:
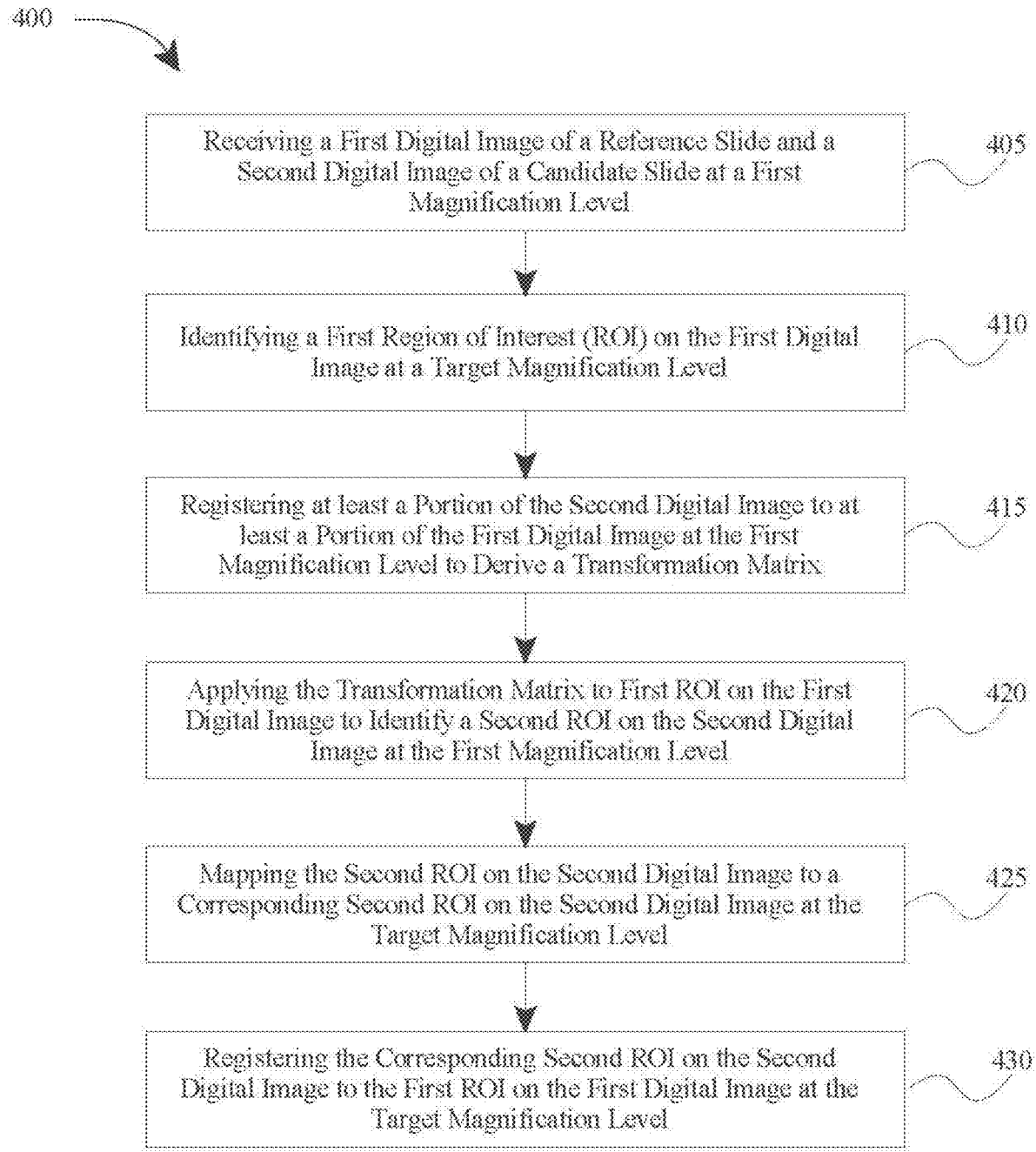
FIG. 4 is a flow diagram of an exemplary method for providing on-demand registration of WSIs.
Figure 5:
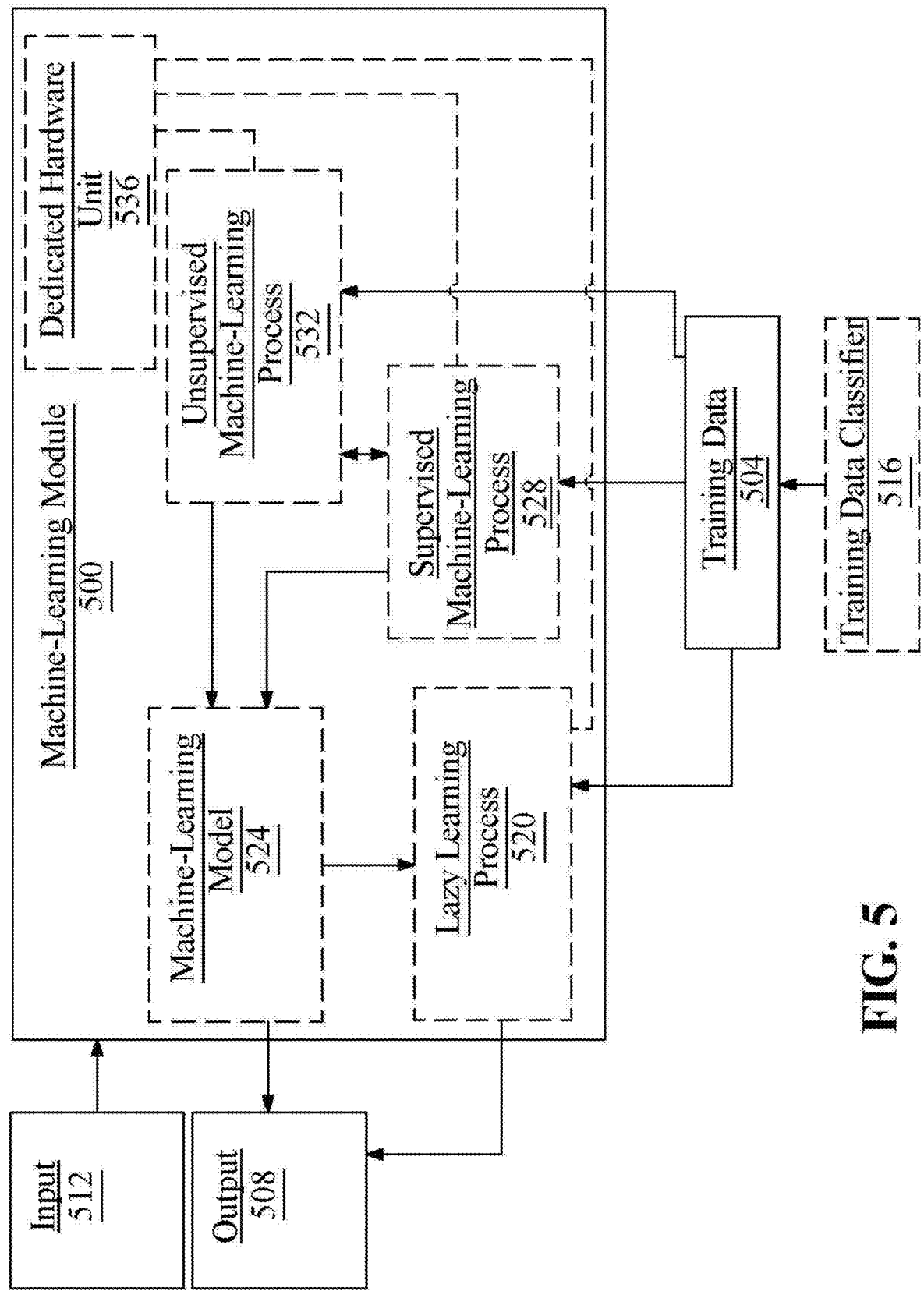
FIG. 5 is a block diagram of an exemplary machine-learning process.

Referring now to FIG. 4, a flow diagram of an exemplary method 400 for on-demand registration of whole slide images (WSIs) is illustrated. The method 400 includes a step 405 of receiving, by at least a processor, at least two digital image taken at a first magnification level, wherein the at least two digital image includes a first digital image of a reference slide and a second digital image of a candidate slide. In some embodiments, each digital image of the at least two digital images may include a whole slide image (WSI) in a pyramid structure, and wherein the pyramid structure may include a plurality of magnification levels containing the first magnification level and the target magnification level. This may be implemented without limitation, as described above with reference to FIGS. 1, 2A-2B, and 3.

With continued reference to FIG. 4, the method 400 includes a step 410 of identifying, by the at least a processor, a first region of interest (ROI) on the first digital image at a target magnification level. In some embodiments, the target magnification level may be higher than the first magnification level. In some embodiments, identifying the first ROI on the first digital image may include training a computer vision model using training data, wherein the training data containing digitized histological slide images at a plurality of magnificent levels as input correlated to a plurality of ROIs as output, and identifying the first ROI as a function of the first digital image using the trained computer vision model. This may be implemented without limitation, as described above with reference to FIGS. 1, 2A-2B, and 3.

With continued reference to FIG. 4, the method 400 includes a step 415 of registering, by the at least a processor, at least a portion of the second digital image to at least a portion of the first digital slide image at the first magnification level to derive a transformation matrix. In some embodiments, the transformation matrix may include a plurality of transformation parameters to align the at least a portion of the second digital image to the at least a portion of the first digital image at the first magnification level. This may be implemented without limitation, as described above with reference to FIGS. 1, 2A-2B, and 3.

With continued reference to FIG. 4, the method 400 includes a step 420 of applying, by the at least a processor, the transformation matrix to the first ROI on the first digital image to identify a second ROI on the second digital image at the first magnification level. This may be implemented without limitation, as described above with reference to FIGS. 1, 2A-2B, and 3.

With continued reference to FIG. 4, the method 400 includes a step 425 of mapping, by the at least a processor, the second ROI on the second digital image to a corresponding second ROI on the second digital image at the target magnification level. This may be implemented without limitation, as described above with reference to FIGS. 1, 2A-2B, and 3.

With continued reference to FIG. 4, the method 400 includes a step 430 of registering, by the at least a processor, the corresponding second ROI on the second digital image to the first ROI on the first digital image at the target magnification level. In some embodiments, registration may include a rigid registration (e.g., an affine transformation) configured to register the corresponding second ROI on the second digital image to the first ROI on the first digital image. In other embodiments, registration may include a non-rigid registration (e.g., an optical flow estimation) to register the corresponding second ROI on the second digital image to the first ROI on the first digital image. This may be implemented without limitation, as described above with reference to FIGS. 1, 2A-2B, and 3.

Referring now to 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine learning software program where the commands to be executed are determined in advance by a user and written in a programming language.

Still referring to 5, "training data," as used herein, is data containing correlations that a machine-learning process may use to model relationships between two or more categories of data elements. For instance, and without limitation, training data 504 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example training data may include digitized histological slide images at a plurality of magnificent levels as input correlated to a plurality of ROIs as output.

Further referring to 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

With further reference to 5, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to 5, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to 5, computing device, processor, and/or module may downsample elements of a training example to a desired lower number of data elements. As a non-limiting example, a high pixel count image may have 556 pixels, however a desired number of pixels may be 128. Processor may down-sample the high pixel count image to convert the 556 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to 5, machine-learning processes as described in this disclosure may be used to generate machine-learning models 524. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include a plurality of digitized histological slide images at a plurality of magnification as described above as inputs, a plurality of ROIs as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms.

Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively, or additionally, one or more errors and/or error function values evaluated in training iterations may be compared to a threshold.

Still referring to 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 532 may not require a response variable; unsupervised processes 532 may be used to find interesting patterns and/or inferences between variables, to determine a degree of correlation between two or more variables, or the like.

Still referring to 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to 5, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to 5, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to 5, one or more processes or algorithms described above may be performed by at least a dedicated hardware unit 536. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 536 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 536 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 536 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 6:
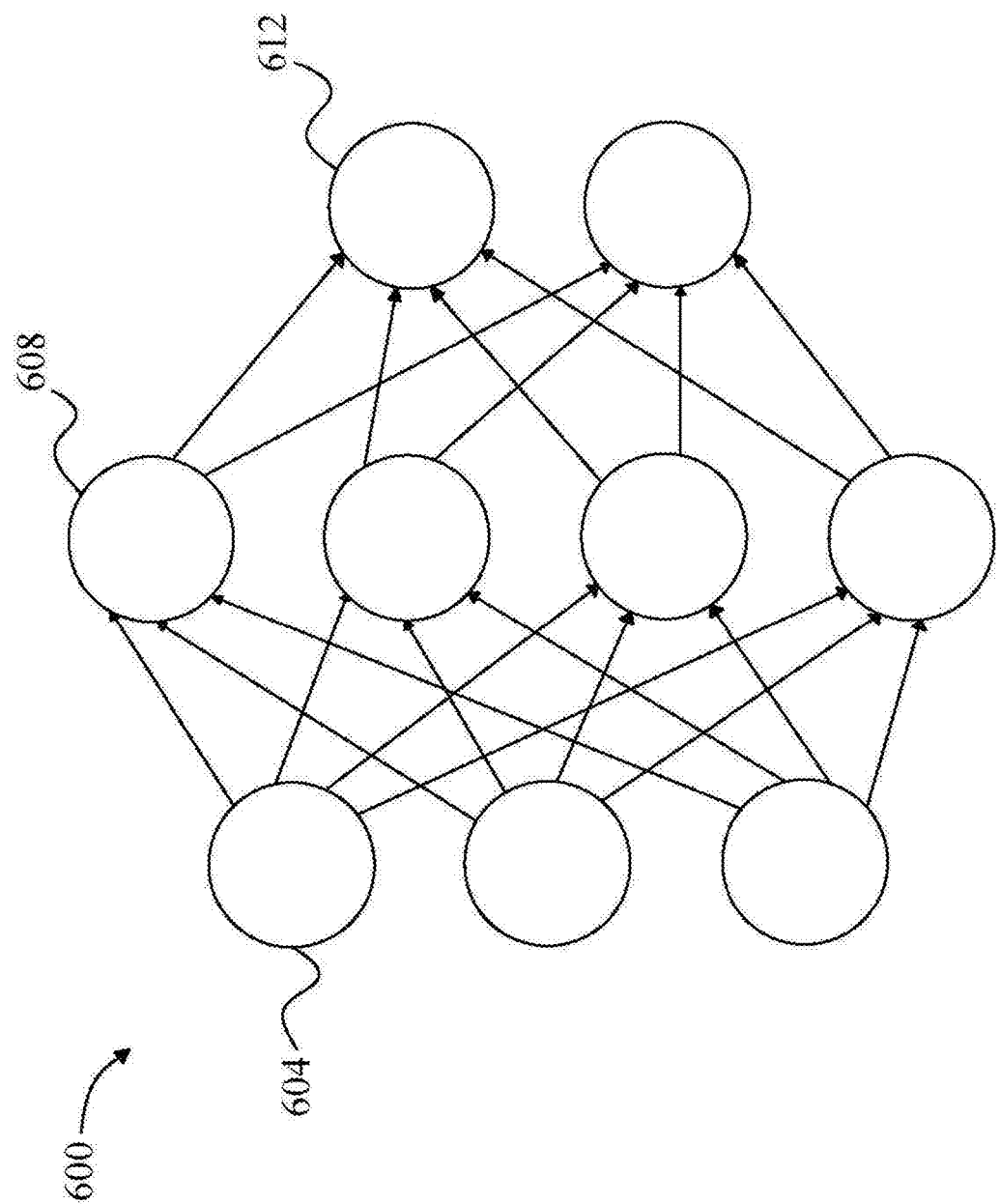
FIG. 6 is a diagram of an exemplary embodiment of a neural network.

Referring now to FIG. 6, an exemplary embodiment of neural network 600 is illustrated. A neural network 600, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
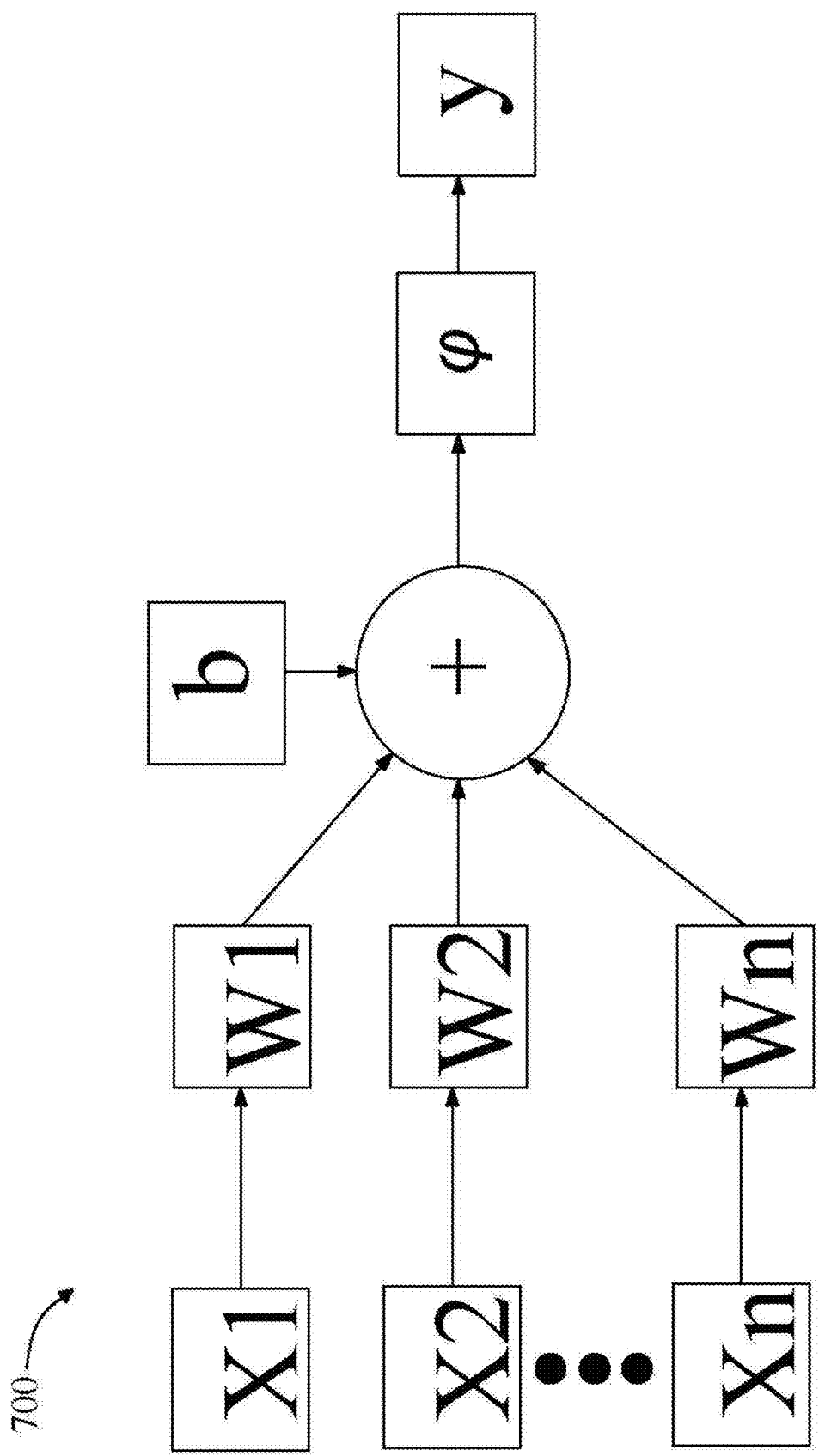
FIG. 7 is a diagram of an exemplary embodiment of a node of a neural network.

Referring now to FIG. 7, an exemplary embodiment of a node 700 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tan h (hyperbolic tangent) function, of the form $$\frac{e^x - e^{-x}}{e^x + e^{-x}},$$

a tan h derivative function such as ƒ(x)=tan h²(x), a rectified linear unit function such as ƒ(x)=max(0, x), a "leaky" and/or "parametric" rectified linear unit function such as ƒ(x)=max (ax, x) for some a, an exponential linear units function such as $$f(x) = \begin{cases} x & \text{for } x \geq 0 \\ \alpha(e^x - 1) & \text{for } x < 0 \end{cases}$$

for some value of a (this function may be replaced and/or weighted by its own derivative in some embodiments), a softmax function such as $$f(x_i) = \frac{e^x}{\sum_i x_i}$$

where the inputs to an instant layer are $x_i$, a swish function such as ƒ(x)=x*sigmoid(x), a Gaussian error linear unit function such as f(x)=a(1+tan h($\sqrt{2/\pi}$(x+bx$_r$))) for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 8:
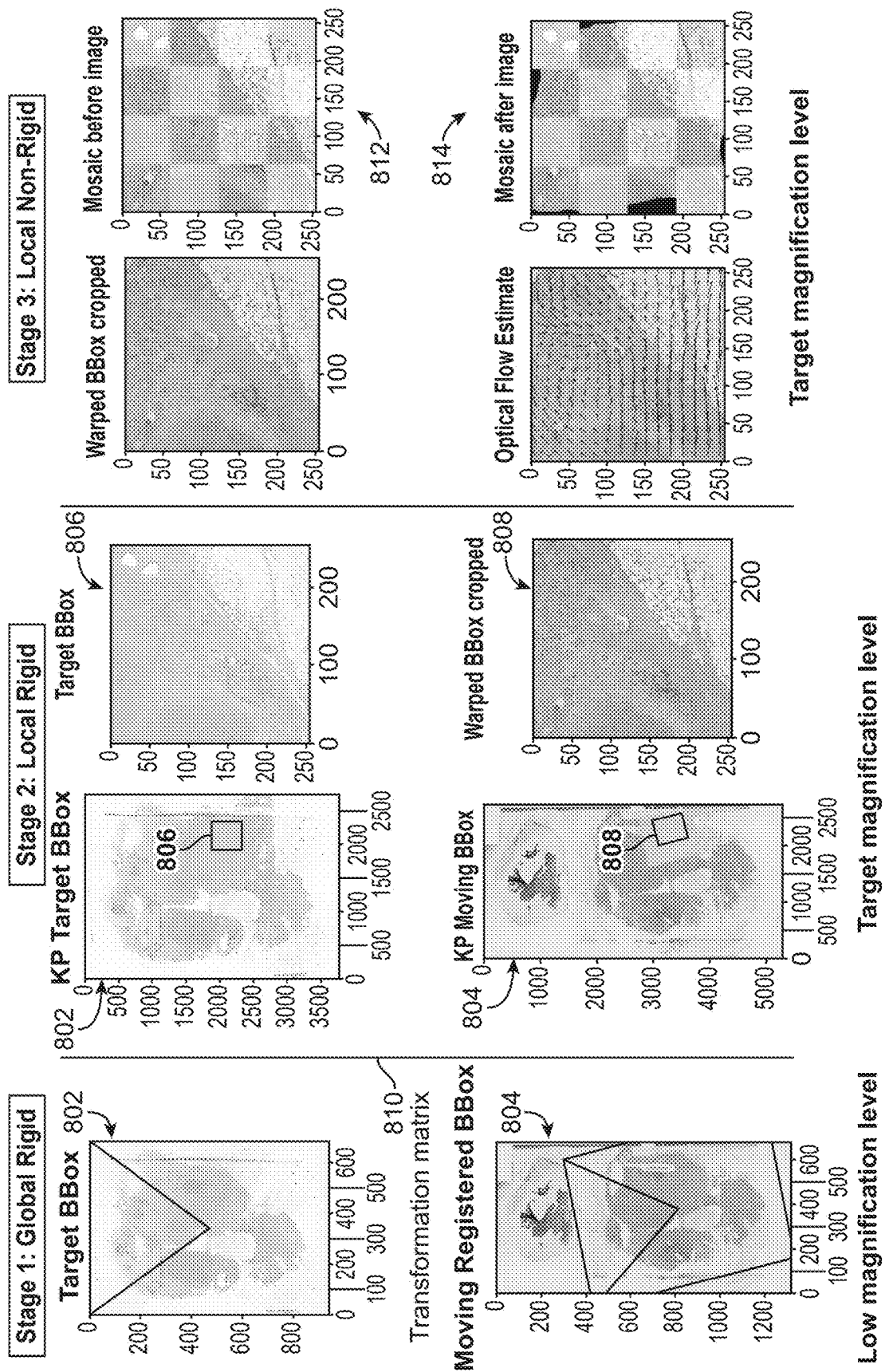
FIG. 8 illustrates a simplified diagram of a method for providing on-demand registration of ROI of multiple slides at a target magnification level, in accordance with certain embodiments of the present disclosure.

FIG. 8 illustrates a simplified diagram of a method for providing on-demand registration of ROI of multiple slides at a target magnification level, in accordance with certain embodiments of the present disclosure.

For various applications involving examining corresponding regions of serial sections from multiple slides, a user may identify a reference slide 802, a candidate slide 804, and a ROI on the reference slide at a target magnification level 806. According to some embodiments consistent with FIG. 1, the reference slide 802 and the candidate slide 804 may correspond to the slide image 112. The reference slide 802 and the candidate slide 804 may be the serial section slides. In some embodiments, the reference slide 802 may correspond to a slide stained in one way (e.g., with H & E staining). In some embodiments, the candidate slide 804 may correspond to an unstained slide, or a slide stained in the other way. The ROI on the reference slide at the target magnification level 806 may also be specified by the user. The ROI may contain certain tissues, organelles, etc. that the user may be interested in, and the target magnification level may be 10×, 5×, etc.

A ROI on the candidate slide at the target magnification level 808 which corresponds to the ROI on the reference slide 806, may be identified. According to some embodiments consistent with FIG. 1, the ROI on the candidate slide 808 may correspond to the processed image, and/or the processed image. In some embodiments, the ROI on the candidate slide 808 may be identified automatically. For example, a computer vision model, such as the computer vision model 140, may be used to identify the ROI on the corresponding candidate slide at the target magnification level.

In some embodiments, the ROI on the candidate slide at the target magnification level 808 may be identified based on least one registration between the candidate slide and the reference slide computed at a lower magnification level than the target magnification level.

People skilled in the art will appreciate that some or all information in the transformation matrix derived from registering two slides at a low magnification level may be used to register the same two slides at higher magnification level.

For example, since the ROI on the reference slide at the target magnification level 806 has already been identified as described above, a portion of the candidate slide may be registered to a portion of the reference slide, each at a lower magnification level to derive a transformation matrix 810. For example, the whole reference slide 802 and the whole candidate slide 804, each at 0.3× magnification level, may be registered to derive the transformation matrix 808. Finally, the ROI on the reference slide 806 may be mapped to a corresponding region on the candidate slide, and the transformation matrix 810 may be applied to the corresponding region to derive the ROI on the candidate slide at the target magnification level 808.

Once the ROI on the candidate slide 808 is identified, it may still need to be registered again to the ROI in the reference slide 806 because it is still likely that the ROI on the candidate slide 808 may be oriented to a certain degree or deformed on the slide at the target magnification level. The registration process may be rigid and/or non-rigid. Taking non-rigid registration as an example, the non-rigid registration may include optical flow estimation. Specifically, a portion of the ROI on the reference slide 806 and a portion of the ROI on the candidate slide 808 may be stitched together into a mosaic slide 812. The mosaic slide 812 may be used for optical flow estimate to derive the final ROI on the candidate slide at the target magnification level 814.

Compared with some registration techniques used in the industry, this method saves unnecessary computation time and storage space because some or all processes described above are performed only once, and it allows the user to select any reference slide and any candidate slide on demand, thus ensuring a better interactive user experience.

However, as described above, although it may be ideal to derive the ROI on the candidate slide at the target magnification level in one shot, it may be difficult for the computer vision model to register portions of two slides at a high magnification level (e.g., a target magnification level such as 10x) directly. Hence there is a need to repeat some or all processes described above by leveraging intermediate magnification levels in the magnification pyramid.

In some embodiments, the ROI on the candidate slide as each iteration's output will be at the higher magnification level than the previous one's magnification level, thus the ROI at the target magnification level may be finally derived. For example, suppose that the target magnification level is 10x, the ROI on the candidate slide in the first iteration may be at 2.5x, the ROI in the second iteration may be at 5x, and finally the ROI in the third and last iteration may be at 10x.

However, as described above, although it is difficult to derive a ROI on a candidate slide at a target magnification level in one shot, it is still worth trying as it may save computation time and storage space. If failed, the method may try to find a lower magnification level at which the registration is successful (e.g., 1.25x). Then the method may perform the bottom-up method based on that registration level to derive the ROI on the candidate slide at the target magnification level. As such, the method strikes a balance between computation time, storage space and user experience.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

Figure 9:
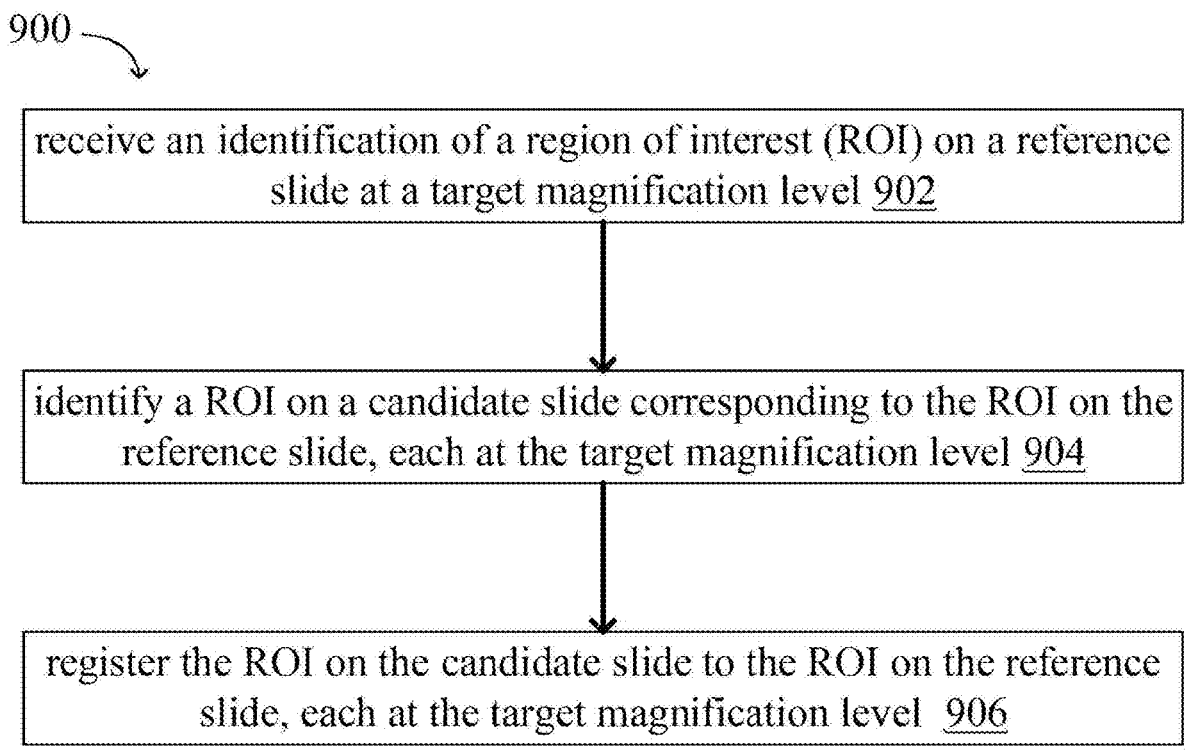
FIG. 9 illustrates a simplified diagram of a method for providing on-demand registration of ROI of multiple slides at a target magnification level, in accordance with certain embodiments of the present disclosure.

FIG. 9 illustrates a simplified diagram of a method 900 for providing on-demand registration of ROI of slides at a target magnification level, in accordance with certain embodiments of the present disclosure. In some embodiments, the target magnification level may be higher than the lowest magnification level of a pyramid (e.g., when the pyramid includes images having 0.3, 2.5, and 10x magnification, the target magnification level may be 2.5x or 10x). Nevertheless, method 900 may leverage the richer topographical information available at lower magnification levels to improve the accuracy and efficiency of the registration at the target magnification level. According to some embodiments consistent with FIG. 1, method 900 may be performed by a computer processor, such as processor 104 based on instructions and/or data stored in a memory, such as memory 108.

At a process 902, an identification of a region of interest (ROI) on a reference slide at a target magnification level is received. The user may specify the reference slide, the ROI on the reference slide, and the target magnification level based on his needs. In some embodiments, the reference slide and a candidate slide to be described below may be serial section slides derived from the same tissue block of the same patient. The user may make such selections on a viewer, such as the viewer 160. For example, the user may make such selection on a user interface of the viewer. Illustratively, the user interface may allow the user to draw a box around (or otherwise select) a portion of an image at a target magnification level on the reference slide. The selected area may be the ROI on the reference slide.

In some embodiments, the ROI may be the whole reference slide at the target magnification level. In some embodiments, the ROI may be a portion of the reference slide at the target magnification level. For example, the ROI may be the portion of the reference slide displayed in a viewer, or a specified region of the reference slide displayed in a viewer.

As described above, a "brute force" registration technique may register the whole panorama at all magnification levels of the pyramid (e.g., the first level 202, the second level 204 and the third level 206 described in FIG. 2B) for all serial section slides. However, as different applications need registration at different magnification levels, such brute force techniques may be limited in practice as they result in unnecessary computation time and high storage space.

The present disclosure may allow on-demand registration (e.g., registration at higher magnification levels may be performed in response to a user identifying a particular ROI at those magnification levels), thus saving computation time and storage space.

Alternatively, a "fixed" registration technique may involve pre-computing registration amongst a fixed set of reference slides and a fixed set of candidate slides. Such techniques may restrict the user's ability to select the reference slide and the candidate slide on demand. The present disclosure allows the user to select any reference slide and any candidate slide on demand, thus ensuring a more interactive user experience. Meanwhile, by processing a selected reference slide and a selected candidate slide, the present disclosure further saves computation time and storage space.

As described above, a digital slide at the lower magnification level may contain richer topographical information (e.g., contours, edges, corners), thus making it easier for a computer program to accurately register the candidate and reference slides. By contrast, it may be inefficient and challenging, if not infeasible, to register the candidate and reference slides at a higher magnification level (e.g., 10×) due to the larger file sizes and reduced amount of topographical information for on a per-pixel basis.

Hence it is desirable to leverage the topographical information available at lower magnification levels to improve the accuracy and efficiency of the registration at the target magnification level. The is because the registration information (e.g., translation, rotation, scale) of a specific pair of reference and candidate slides is similar across different magnification levels. In some embodiments, the ROI on the candidate slide at the target magnification level may be identified based on least one registration between the candidate slide and the reference slide computed at a lower magnification level than the target magnification level. For example, when the target magnification level is 10×, the registration between the candidate slide and the reference slide may be computed at 5×. In some embodiments, the ROI on the candidate slide corresponding to the ROI on the reference slide, both at the target magnification level, may be identified by performing some or all processes described in FIG. 4 below.

At a process 906, the ROI on the candidate slide is registered to the ROI in the reference slide. Both ROI on the candidate slide and the ROI on the reference slide are at the target magnification level. The corresponding ROI on the candidate slide at the target magnification level still needs to be registered with the ROI on the reference slide, because it is still likely that the ROI on the candidate slide may be oriented to a certain degree or deformed on the slide at the target magnification level.

The registration may be performed by a computer vision model, such as computer vision model 140, that is trained to register the ROI on the reference slide to a corresponding ROI on the candidate slide. The computer vision model may be executed using specialized computing hardware, such as a graphics processing unit (GPU) or an application-specific integrated circuit (ASIC). The computer vision model may be a supervised vision model, self-supervised vision model, or any other suitable models those skilled in the art will appreciate. In some embodiments, the computer vision model may be a pre-trained computer vision model. For example, the computer vision model may be trained with a plurality of ROI on the reference slides and corresponding ROI on the candidate slides at different magnification levels.

In some embodiments, the registration may be rigid as it provides translation, rotation, scale, etc. transformation to the ROI on the candidate slide at the target magnification level.

Example techniques for rigid registration may include geometric transformation (e.g., corners detection, contours detection) and machine learning/deep learning transformation (e.g., partial-affine transformation).

For example, object detection or object recognition in computer vision refers to detecting the existence of an object or multiple objects, their categories, and their locations. As one application of object detection technology, segmentation may be used to identify clusters of pixels in the image representation that correspond to the same entity. Segmentation may be used to identify the contour of an apple, a car, a person, etc. Illustratively, segmenting the image representation of an object may include figuring out the bounding path (e.g., contour) of the object. Accordingly, the computer vision model may be trained to identify the bounding path of the object. An example of a computer vision model that can identify the bounding path of an object in this manner is the DINO model, which is described in Mathilde Caron et. al, Emerging Properties in Self-Supervised Vision Transformers, Computer Vision and Pattern Recognition, 2021, which is incorporated by reference herein in its entirety.

In some embodiments, the registration may be non-rigid as it involves mitigate deformation in the ROI on the candidate slide at the target magnification level. Example techniques for non-rigid registration may include geometric transformation (e.g., point-cloud, optical flow estimation) and machine learning/deep learning transformation (e.g., vector field). For example, the optical flow estimation may be used for non-rigid registration. Optical flow may be used to predict movement between two consecutive images. Optical flow models take two images as input and predict a flow which indicates the displacement of every single pixel in the first image and maps it to its corresponding pixel in the second image.

In some embodiments, registering the ROI on the candidate slide to the ROI in the reference slide, both at the target magnification level, may include both rigid and non-rigid registration. However, the non-rigid transformation is also a computationally costly process. Hence in some embodiments, the non-rigid transformation may be avoided if it is determined that the local distortion in the ROI on the candidate slide at the target magnification level is below a threshold value.

Figure 10:
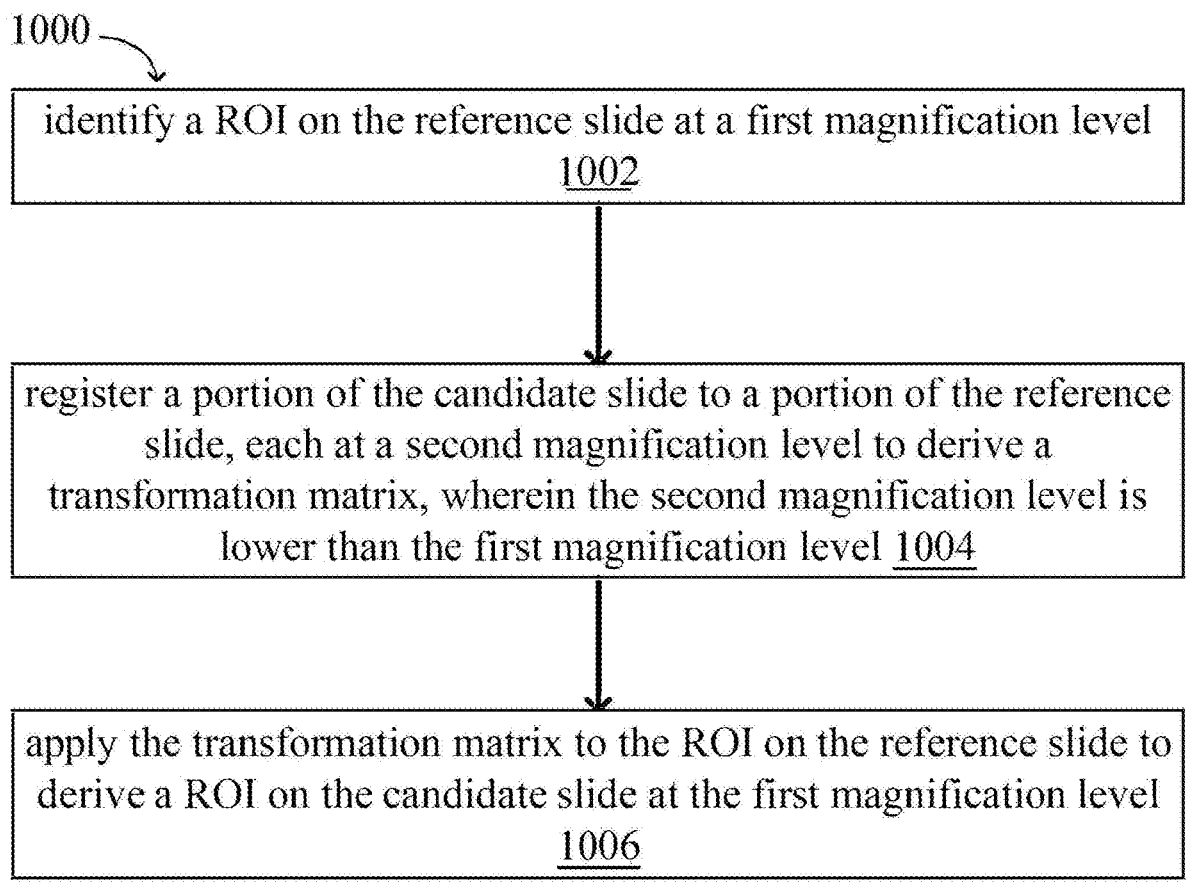
FIG. 10 illustrates a simplified diagram of a method for identifying a ROI on a candidate slide corresponding to the ROI on the reference slide, each at a first magnification level, in accordance with certain embodiments of the present disclosure.

FIG. 10 illustrates a simplified diagram of a method 1000 for identifying a ROI on a candidate slide corresponding to the ROI on the reference slide, each slide having the same magnification level, in accordance with certain embodiments of the present disclosure. In some embodiments, method 1000 may identify a ROI on a candidate slide at an output magnification level by leveraging the richer topographical information available at a lower magnification level. For example, the topographical information available at 2.5× may be used to identify a ROI on a candidate slide at 5×. When the output magnification level is set as the target magnification level, method 1000 may be used to identify a ROI on a candidate slide at the target magnification level. According to some embodiments consistent with FIG. 1, method 1000 may be performed by a computer processor, such as processor 104 based on instructions and/or data stored in a memory, such as memory 108. According to some embodiments consistent with FIG. 1, method 400 may be used to implement the process 904.

At an optional process 1002, a ROI on the reference slide at an output magnification level (e.g., a first magnification level) is identified. In some embodiments, the ROI on the reference slide is identified by mapping the ROI on the reference slide at a magnification level higher than the output magnification level to a corresponding region on the reference slide at the output magnification level. For example, the magnification level may be 10× and the output magnification level may be 2.5×. In some embodiments, if the output magnification level is set as the target magnification level, the process 1002 may become optional as there is no mapping needed.

At a process 1004, a portion of the candidate slide is registered to a portion of the reference slide to derive a transformation matrix. Both slides are at a baseline magnification level (e.g., a second magnification level) which is lower than the output magnification level. In some embodiments, the baseline magnification level may be the default magnification level of the digital slide (e.g., WSI). For example, the baseline magnification level may be 0.3×.

As described in FIG. 2B, it may be easier for the computer vision model to register portions of two slides at a low magnification level (e.g., 0.3×), than to register them at a high magnification level (e.g., 10×). For example, it may be hard for the computer vision model to register a portion of the candidate slide to a portion of the reference slide at the output magnification level in one shot, while it is relatively easy for the computer vision model to register two slides at a magnification level lower than the output magnification level (e.g., the baseline magnification level). However, the transformation matrix derived by registering two slides at the lower magnification level may still be helpful to register these two slides at the high magnification level, the details of which is to be described below.

The registration may be performed by a computer vision model, such as computer vision model 180, that is trained to register the ROI on the reference slide to a corresponding ROI on the candidate slide.

In some embodiments, the registration is rigid. For example, the rigid registration may include affine transformation. The affine transformation may include the identification of key points (e.g., the points with gradients in two orthogonal directions) and descriptors (e.g., feature vector invariant to translation, rotation and scale) on the ROI on the reference slides and corresponding ROI on the candidate slides. Then the affine transformation may identify the correspondences by matching key points across two slides using distance between descriptors. Finally, affine transformation may perform in-plane rotation, scale, skew and translation to derive a transformation matrix. For example, the transformation matrix may be a 2×3 matrix representing 6 degrees of freedom (DoF).

In some embodiments, a portion of the reference slide may include the whole slide (e.g., the whole panorama) at the baseline magnification level. In some embodiments, a portion of the reference slide may include the whole slide presented in a viewer (e.g., the mini-panorama, sub-regions) at the baseline magnification level. For example, the whole slide presented in the viewer may include the ROI on the reference slide. In some embodiments, a portion of the reference slide may include the ROI on the reference slide at the baseline magnification level.

Compared with registration techniques which register the whole panorama, which causes unnecessary computation time and high storage space, the techniques described in the current disclosure may use a portion of the slide for registration. As discussed above, in some embodiments, the portion of the slide may include the reference slide presented in a viewer, or even the ROI on the reference slide. As such, the current disclosure further reduces computation time and storage space, thus delivering a better user experience.

At a process 1006, the transformation matrix is applied to the ROI on the reference slide to derive a ROI on the candidate slide at the output magnification level. The transformation matrix may be used to identify the ROI on the candidate slide at the output magnification level by performing in-plane rotation, scale, skew, translation, etc. to derive the ROI on the candidate slide at the output magnification level. In some embodiments, if the output magnification level is set as the target magnification level, the transformation matrix may be used to identify the ROI on the candidate slide at the target magnification level.

As described in the process 1004, the portion of the candidate slide may be registered to the portion of the reference slide, at the baseline magnification level to derive a transformation matrix. The transformation matrix may include information needed for performing in-plane rotation, scale, skew, translation, etc. People skilled in the art will appreciate that some or all information in the transformation matrix derived from registering two slides at a low magnification level (e.g., the second magnification level) may be used to register the same two slides at higher magnification levels (e.g., the first magnification level). For example, the in-plane rotation degree at the baseline magnification level should be similar to or even same as that at the output magnification level.

In some embodiments, to identify the ROI on the candidate slide at the target magnification level, the output magnification level may be set directly as the target magnification level. The process 1002 may be made optional and some or all rest processes described above is performed only once. As such, the output will be the ROI on the candidate slide at the target magnification level, thus saving computation time and storage space.

FIG. 11 illustrates a simplified diagram of method 1100 for identifying a ROI on a candidate slide corresponding to the ROI on the reference slide, each at the target magnification level, in accordance with certain embodiments of the present disclosure. According to some embodiments consistent with FIG. 1, method 1100 may be performed by a computer processor, such as processor 160 based on instructions and/or data stored in a memory, such as memory 108. According to some embodiments consistent with FIG. 1, method 1100 may be used to implement process 904.

As described in the process 1006 above, although it may be ideal to derive the ROI on the candidate slide at the target magnification level in one shot, it may be difficult for the computer vision model to register portions of two slides at a high magnification level (e.g., a target magnification level) directly, as explained in the process 904. This is specially the case when the target magnification level is high (e.g., 10×) as the digital slide at this level may contain a lower amount of tissue on the slide for the registration process. Hence there is a need to repeat some or all processes described in FIG. 10 by leveraging intermediate magnification levels in the magnification pyramid.

In some embodiments, FIG. 11 repeats some or all processes described in FIG. 10. As such, the ROI on the candidate slide as each iteration's output will be at the higher magnification level than the previous one's magnification level, thus the ROI at the target magnification level may be finally derived. In other words, FIG. 11 takes a bottom-up approach by first identifying the ROI on the candidate slide at a low magnification level, then identifying the ROIs at rising magnification levels in some iterations, and finally reaching the target magnification level. For example, suppose the target magnification level is 10×, the ROI on the candidate slide in the first iteration may be at 2.5×, the ROI in the second iteration may be at 5×, and finally the ROI in the third and last iteration may be at 10×.

At a process 1102, some or all steps in FIG. 10 is performed to derive a ROI on a candidate slide at an output magnification level (e.g., a first magnification level). The output magnification level is set as a first value lower than a target magnification level. For example, the target magnification level may be 10× and the first value may be 2.5×. As such, the aim is to derive the ROI on the candidate slide at the magnification level lower than the target magnification level, so that it is easier for the computer vision model to register portions of two slides at this level than at the target magnification level as described in process 906.

In some embodiments, as described in the process 1002 above, the ROI on the reference slide at the output magnification level is identified by mapping the ROI on the reference slide at the target magnification level to the corresponding region on the reference slide at the output magnification level.

In some embodiments, a baseline magnification level (e.g., a second magnification level) described in the process 1004 may be the default magnification level of the digital slide (e.g., WSI). For example, the baseline magnification level may be 0.3×.

At a process 1104, some or all steps in FIG. 10 is performed to derive the ROI on the candidate slide at the output magnification level. The output magnification level is set as a second value higher than the first value. For example, the second value may be 5×. As the other example, the second value may be the target magnification value. As such, the aim is to derive the ROI on the candidate slide at the magnification level higher than the first value. By repeating the process 504, the ROI on the candidate slide as each iteration's output will be at the higher magnification level than the previous one's magnification level, thus the ROI on the candidate slide at the target magnification level may be finally derived.

In some embodiments, the ROI on the reference slide at the output magnification level is identified by mapping the ROI on the reference slide at the first value to the corresponding region on the reference slide at the second value.

In some embodiments, the baseline magnification level described in the process 1004 may be set as the first value. For example, the baseline magnification level may be set as 2.5×. Since the portion of the candidate slide at the first value is the output of the process 1102, it is readily available for being registered to the portion of the reference slide at the same value, thus saving the trouble for finding a new portion of the candidate slide at a magnification level.

Figure 12:
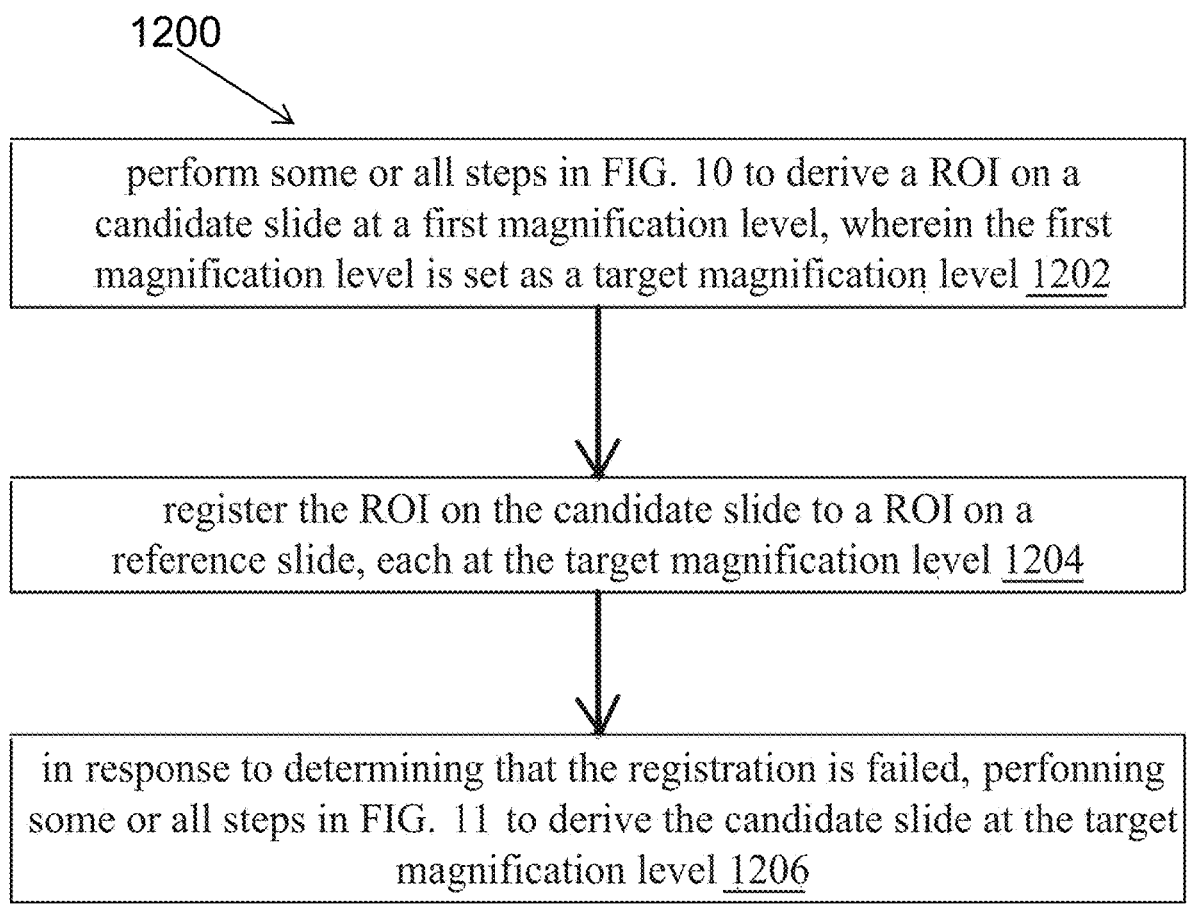
FIG. 12 illustrates a simplified diagram of a method for identifying a ROI on a candidate slide corresponding to the ROI on the reference slide, each at the target magnification level, in accordance with certain embodiments of the present disclosure.

FIG. 12 illustrates a simplified diagram of a method 1200 for identifying a ROI on a candidate slide corresponding to the ROI on the reference slide, each at the target magnification level, in accordance with certain embodiments of the present disclosure. According to some embodiments consistent with FIG. 1, method 1200 may be performed by a computer processor, such as processor 104 based on instructions and/or data stored in a memory, such as memory 108. According to some embodiments consistent with FIG. 1, method 1200 may be used to implement the process 904.

At a process 1202, some or all process in FIG. 10 is performed to derive a ROI on a candidate slide at a first magnification level, wherein the first magnification level is set as a target magnification level. As described in FIG. 11, although it is difficult to derive a ROI on a candidate slide at a target magnification level in one shot, it is still worth trying as some or all processes in FIG. 11 still needs certain computation time and storage space.

At a process 1204, the ROI on the candidate slide is registered to a ROI on a reference slide, each at the target magnification level. The process 1204 is similar to or even same as the process 306 and it won't be repeated for brevity.

At a process 1206, in response to determining that the registration is failed, performing some or all steps in FIG. 11 to derive the candidate slide at the target magnification level.

Compared with the bottom-up method 1100 described in FIG. 11, the method 1200 may first try to derive the ROI on the candidate slide at the target magnification level (e.g., 40×), then try to register the ROI on the candidate slide to the ROI on the reference slide, each at the target magnification level. If failed, the method may try to find a magnification level lower than the target at which the registration is successful (e.g., 1.25×). The method may further perform the bottom-up method based on that registration level to finally derive the ROI on the candidate slide at the target magnification level. As such, the method strikes a balance between computation time, storage space and user experience.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 13:
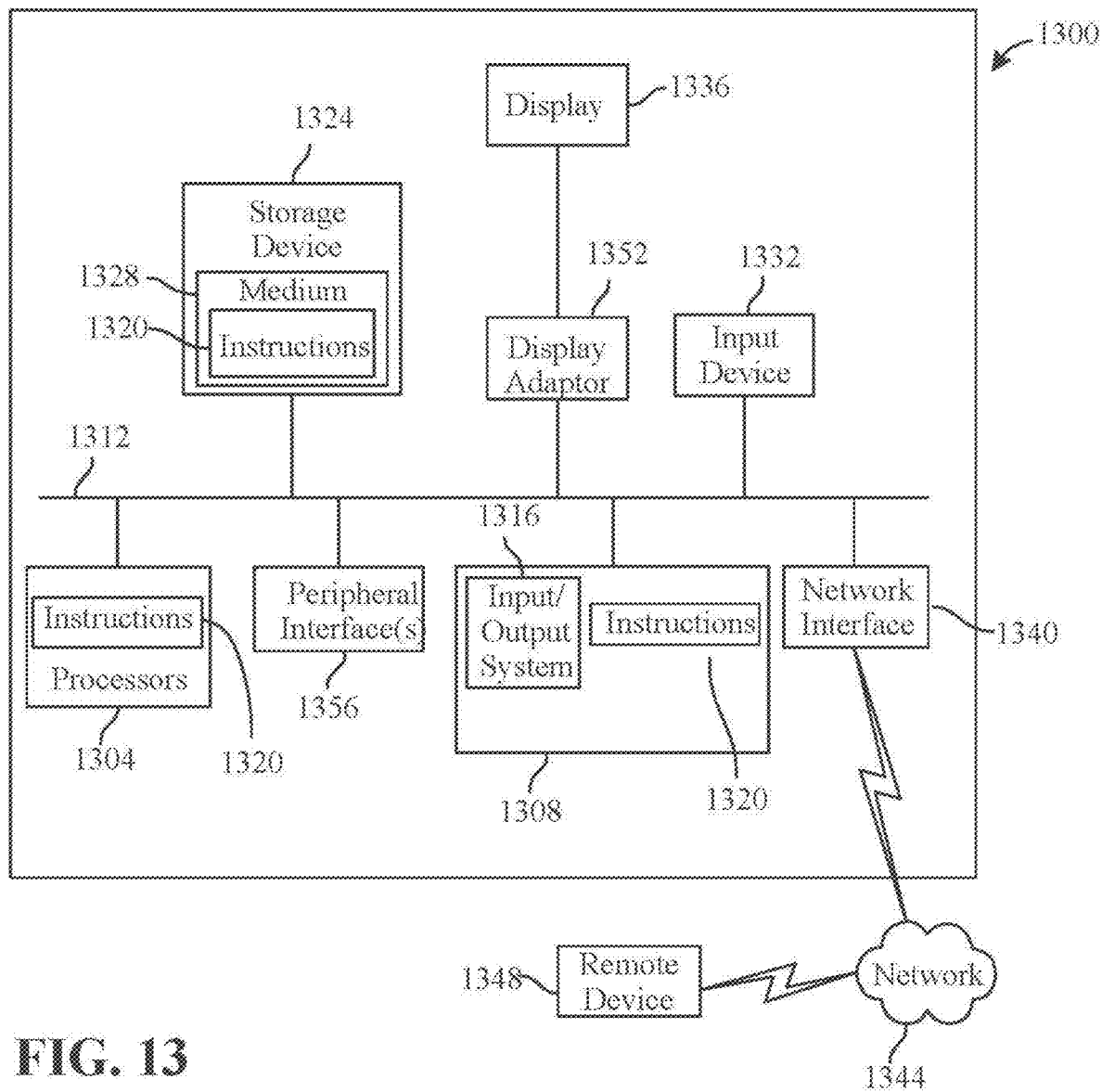
FIG. 13 is a block diagram of a computing system that can be used to implement any one or more of the methodologies disclosed herein and any one or more portions thereof.

FIG. 13 shows a diagrammatic representation of one embodiment of a computing device in the exemplary form of a computer system 1300 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1300 includes a processor 1304 and a memory 1308 that communicate with each other, and with other components, via a bus 1312. Bus 1312 may include any of several types of bus structures including, but not limited to, a memory bus, a memory controller, a peripheral bus, a local bus, and any combinations thereof, using any of a variety of bus architectures.

Processor 1304 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1304 may be organized according to Von Neumann and/or Harvard architecture as a non-limiting example. Processor 1304 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1308 may include various components (e.g., machine-readable media) including, but not limited to, a random-access memory component, a read only component, and any combinations thereof. In one example, a basic input/output system 1316 (BIOS), including basic routines that help to transfer information between elements within computer system 1300, such as during start-up, may be stored in memory 1308. Memory 1308 may also include (e.g., stored on one or more machine-readable media) instructions (e.g., software) 1320 embodying any one or more of the aspects and/or methodologies of the present disclosure. In another example, memory 1308 may further include any number of program modules including, but not limited to, an operating system, one or more application programs, other program modules, program data, and any combinations thereof.

Computer system 1300 may also include a storage device 1324. Examples of a storage device (e.g., storage device 1324) include, but are not limited to, a hard disk drive, a magnetic disk drive, an optical disc drive in combination with an optical medium, a solid-state memory device, and any combinations thereof. Storage device 1324 may be connected to bus 1312 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1324 (or one or more components thereof) may be removably interfaced with computer system 1300 (e.g., via an external port connector (not shown)). Particularly, storage device 1324 and an associated machine-readable medium 1328 may provide nonvolatile and/or volatile storage of machine-readable instructions, data structures, program modules, and/or other data for computer system 1300. In one example, software 1320 may reside, completely or partially, within machine-readable medium 1328. In another example, software 1320 may reside, completely or partially, within processor 1304.

Computer system 1300 may also include an input device 1332. In one example, a user of computer system 1300 may enter commands and/or other information into computer system 1300 via input device 1332. Examples of an input device 1332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1332 may be interfaced to bus 1312 via any of a variety of interfaces (not shown) including, but not limited to, a serial interface, a parallel interface, a game port, a USB interface, a FIREWIRE interface, a direct interface to bus 1312, and any combinations thereof. Input device 1332 may include a touch screen interface that may be a part of or separate from display 1336, discussed further below. Input device 1332 may be utilized as a user selection device for selecting one or more graphical representations in a graphical interface as described above.

A user may also input commands and/or other information to computer system 1300 via storage device 1324 (e.g., a removable disk drive, a flash drive, etc.) and/or network interface device 1340. A network interface device, such as network interface device 1340, may be utilized for connecting computer system 1300 to one or more of a variety of networks, such as network 1344, and one or more remote devices 1348 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1344, may employ a wired and/or a wireless mode of communication. In general, any network topology may be used. Information (e.g., data, software 1320, etc.) may be communicated to and/or from computer system 1300 via network interface device 1340.

Computer system 1300 may further include a video display adapter 1352 for communicating a displayable image to a display device, such as display device 1336. Examples of a display device include, but are not limited to, a liquid crystal display (LCD), a cathode ray tube (CRT), a plasma display, a light emitting diode (LED) display, and any combinations thereof. Display adapter 1352 and display device 1336 may be utilized in combination with processor 1304 to provide graphical representations of aspects of the present disclosure. In addition to a display device, computer system 1300 may include one or more other peripheral output devices including, but not limited to, an audio speaker, a printer, and any combinations thereof. Such peripheral output devices may be connected to bus 1312 via a peripheral interface 1356. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for on-demand registration of whole slide images (WSIs), the apparatus comprises: at least a processor; and a memory communicatively connected to the at least a processor, wherein the memory contains instructions configuring the at least a processor to: receive, at least two digital images taken at a first magnification level, wherein each digital image of the at least two images comprises a WSI in a pyramid structure wherein the base layer of the pyramid structure comprises a highest resolution image and each subsequent layer of the pyramid structure includes lower resolution images and wherein the at least two digital images comprises: a first digital image of a reference slide; and a second digital image of a candidate slide; identify a first region of interest (ROI) on the first digital image at a target magnification level; training a computer vision model using training data, wherein the training data comprises digitized histological slide images at a plurality of magnification levels as input correlated to a plurality of ROIs as output; and identifying the first ROI as a function of the first digital image using the trained computer vision model;
   register at least a portion of the second digital image to at least a portion of the first digital slide image at the first magnification level to derive a transformation matrix; apply the transformation matrix comprising transformation shearing parameters to the first ROI on the first digital image to identify a second ROI on the second digital image at the first magnification level; map the second ROI on the second digital image to a corresponding second ROI on the second digital image at the target magnification level;
   and register the corresponding second ROI on the second digital image to the first ROI on the first digital image at the target magnification level.

2. The apparatus of claim 1, wherein each digital image of the at least two digital images comprises a whole slide image (WSI) in a pyramid structure.

3. The apparatus of claim 2, wherein the pyramid structure comprises a plurality of magnification levels containing the first magnification level and the target magnification level.

4. The apparatus of claim 1, wherein the target magnification level is higher than the first magnification level.

5. The apparatus of claim 1, wherein the transformation matrix comprises a plurality of transformation parameters to align the at least a portion of the second digital image to the at least a portion of the first digital image at the first magnification level.

6. The apparatus of claim 1, wherein the at least a processor is configured to perform a rigid registration to register the corresponding second ROI on the second digital image to the first ROI on the first digital image.

7. The apparatus of claim 6, wherein the rigid registration comprises an affine transformation.

8. The apparatus of claim 1, wherein the at least a processor is configured to perform a non-rigid registration to register the corresponding second ROI on the second digital image to the first ROI on the first digital image.

9. The apparatus of claim 8, wherein the non-rigid registration comprises optical flow estimation.

10. A method for on-demand registration of whole slide images (WSIs), the method comprises: receiving, by at least a processor, at least two digital images taken at a first magnification level, wherein each digital image of the at least two images comprises a WSI in a pyramid structure wherein the base layer of the pyramid structure comprises a highest resolution image and each subsequent layer of the pyramid structure includes lower resolution images and wherein the at least two digital image comprises: a first digital image of a reference slide; and a second digital image of a candidate slide; identifying, by the at least a processor, a first region of interest (ROI) on the first digital image at a target magnification level;
    training a computer vision model using training data, wherein the training data comprises digitized histological slide images at a plurality of magnification levels as input correlated to a plurality of ROIs as output; and identifying the first ROI as a function of the first digital image using the trained computer vision model;
    registering, by the at least a processor, at least a portion of the second digital image to at least a portion of the first digital slide image at the first magnification level to derive a transformation matrix; applying, by the at least a processor, the transformation matrix comprising transformation shearing parameters to the first ROI on the first digital image to identify a second ROI on the second digital image at the first magnification level;
    mapping, by the at least a processor, the second ROI on the second digital image to a corresponding second ROI on the second digital image at the target magnification level;
    and registering, by the at least a processor, the corresponding second ROI on the second digital image to the first ROI on the first digital image at the target magnification level.

11. The method of claim 10, wherein each digital image of the at least two digital images comprises a whole slide image (WSI) in a pyramid structure.

12. The method of claim 11, wherein the pyramid structure comprises a plurality of magnification levels containing the first magnification level and the target magnification level.

13. The method of claim 10, wherein the target magnification level is higher than the first magnification level.

14. The method of claim 10, wherein the transformation matrix comprises a plurality of transformation parameters to align the at least a portion of the second digital image to the at least a portion of the first digital image at the first magnification level.

15. The method of claim 10, further comprises:
performing, by the at least a processor, a rigid registration to register the corresponding second ROI on the second digital image to the first ROI on the first digital image.

16. The method of claim 15, wherein the rigid registration comprises an affine transformation.

17. The method of claim 10, further comprises:
performing, by the at least a processor, a non-rigid registration to register the corresponding second ROI on the second digital image to the first ROI on the first digital image.

18. The method of claim 17, wherein the non-rigid registration comprises optical flow estimation.

* * * * *